(12) United States Patent
Reilly et al.

(10) Patent No.: US 12,744,035 B2
(45) **Date of Patent: *Sep. 22, 2026**

(54) VOICE DETECTION BY MULTIPLE DEVICES

(71) Applicant: Sonos, Inc., Goleta, CA (US)

(72) Inventors: Jonathon Reilly, Cambridge, MA (US); Gregory Burlingame, Woburn, MA (US); Christopher Butts, Evanston, IL (US); Romi Kadri, Cambridge, MA (US); Jonathan P. Lang, Santa Barbara, CA (US)

(73) Assignee: Sonos, Inc., Goleta, CA (US)

(*) Notice: Subject to any disclaimer, the term of this patent is extended or adjusted under 35 U.S.C. 154(b) by 549 days.

This patent is subject to a terminal disclaimer.

(21) Appl. No.: 18/323,726

(22) Filed: May 25, 2023

(65) Prior Publication Data

US 2024/0029731 A1 Jan. 25, 2024

Related U.S. Application Data

(63) Continuation of application No. 16/915,234, filed on Jun. 29, 2020, now Pat. No. 11,664,023, which is a (Continued)

(51) Int. Cl.
*G10L 15/00* (2013.01)
*G10L 15/02* (2006.01)

(Continued)

(52) U.S. Cl.
CPC .............. *G10L 15/22* (2013.01); *G10L 15/02* (2013.01); *G10L 15/20* (2013.01); *G10L 15/34* (2013.01); *G10L 2015/223* (2013.01)

(58) Field of Classification Search
CPC ... G10L 15/22; G10L 2015/223; G10L 15/26; G10L 15/265; G10L 15/30; G10L 15/08; G10L 15/00; G10L 17/005
See application file for complete search history.

(56) References Cited

U.S. PATENT DOCUMENTS 999,715 A 8/1911 Gundersen
5,717,768 A 2/1998 Laroche (Continued)

FOREIGN PATENT DOCUMENTS

CN 1323435 A 11/2001
CN 1748250 A 3/2006

(Continued)

OTHER PUBLICATIONS

S. Soda, M. Nakamura, S. Matsumoto, S. Izumi, H. Kawaguchi and M. Yoshimoto, "Handsfree Voice Interface for Home Network Service Using a Microphone Array Network," 2012 Third International Conference on Networking and Computing, 2012, pp. 195-200. (Year: 2012).*

(Continued)

*Primary Examiner* — Edgar X Guerra-Erazo
(74) *Attorney, Agent, or Firm* — Fortem IP LLP

(57) ABSTRACT

Disclosed herein are example techniques for voice detection by multiple NMDs. An example implementation may involve one or more servers receiving, via a network interface, data representing multiple audio recordings of a voice input spoken by a given user, each audio recording recorded by a respective NMD of the multiple NMDs, wherein the voice input comprises a detected wake-word. Based on respective sound pressure levels of the multiple audio recordings of the voice input, the servers (i) select a particular NMD of the multiple NMDs and (ii) forego selection of other NMDs of the multiple NMDs. The servers send, via the network interface to the particular NMD, data representing a playback command that corresponds to a voice command in the voice input represented in the multiple audio recordings, wherein the data representing the playback command causes the particular NMD to play back audio content according to the playback command.

20 Claims, 6 Drawing Sheets

Related U.S. Application Data continuation of application No. 16/416,752, filed on May 20, 2019, now Pat. No. 10,699,711, which is a continuation of application No. 16/214,666, filed on Dec. 10, 2018, now Pat. No. 10,297,256, which is a continuation of application No. 15/211,748, filed on Jul. 15, 2016, now Pat. No. 10,152,969.

(51) Int. Cl.

*G10L 15/20* (2006.01)
*G10L 15/22* (2006.01)
*G10L 15/34* (2013.01)

(56) References Cited

U.S. PATENT DOCUMENTS 5,857,172 A 1/1999 Rozak
6,070,140 A 5/2000 Tran
6,219,645 B1 4/2001 Byers
7,516,068 B1 4/2009 Clark
7,705,565 B2 4/2010 Patino et al.
8,085,947 B2 12/2011 Haulick et al.
8,233,632 B1 7/2012 MacDonald et al.
8,325,909 B2 12/2012 Tashev et al.
8,489,398 B1 7/2013 Gruenstein
8,594,320 B2 11/2013 Faller
8,620,232 B2 12/2013 Helsloot
8,639,214 B1 1/2014 Fujisaki
8,676,273 B1 3/2014 Fujisaki
8,719,039 B1 5/2014 Sharifi
8,762,156 B2 6/2014 Chen
8,768,712 B1 7/2014 Sharifi
8,798,995 B1 8/2014 Edara
8,898,063 B1 11/2014 Sykes et al.
9,002,024 B2 4/2015 Nakadai et al.
9,047,857 B1 6/2015 Barton
9,070,367 B1 6/2015 Hoffmeister et al.
9,088,336 B2 7/2015 Mani et al.
9,183,845 B1 11/2015 Gopalakrishnan et al.
9,313,317 B1 4/2016 Lebeau et al.
9,354,687 B2 5/2016 Bansal et al.
9,361,885 B2 6/2016 Ganong, III et al.
9,443,516 B2 9/2016 Katuri et al.
9,491,033 B1 11/2016 Soyannwo et al.
9,514,747 B1 12/2016 Bisani et al.
9,532,139 B1 12/2016 Lu et al.
9,542,941 B1 1/2017 Weksler et al.
9,558,755 B1 1/2017 Laroche et al.
9,640,194 B1 5/2017 Nemala et al.
9,672,812 B1 6/2017 Watanabe et al.
9,691,384 B1 6/2017 Wang et al.
9,706,320 B2 7/2017 Starobin et al.
9,749,738 B1 8/2017 Adsumilli et al.
9,756,422 B2 9/2017 Paquier et al.
9,767,786 B2 9/2017 Starobin et al.
9,779,732 B2 10/2017 Lee et al.
9,779,734 B2 10/2017 Lee
9,781,532 B2 10/2017 Sheen
9,799,330 B2 10/2017 Nemala et al.
9,805,733 B2 10/2017 Park
9,812,128 B2 11/2017 Mixter et al.
9,875,740 B1 1/2018 Kumar et al.
9,898,250 B1 2/2018 Williams et al.
9,899,021 B1 2/2018 Vitaladevuni et al.
9,992,642 B1 6/2018 Rapp et al.
9,997,151 B1 6/2018 Ayrapetian et al.
10,025,447 B1 7/2018 Dixit et al.
10,028,069 B1 7/2018 Lang
10,038,419 B1 7/2018 Elliot et al.
10,089,981 B1 10/2018 Elangovan et al.
10,127,908 B1 11/2018 Deller et al.
10,134,388 B1 11/2018 Lilly
10,134,398 B2 11/2018 Sharifi
10,152,969 B2 * 12/2018 Reilly .................... G06F 3/167
10,157,042 B1 12/2018 Jayakumar et al.
10,186,266 B1 1/2019 Devaraj et al.
10,186,276 B2 1/2019 Dewasurendra et al.
10,204,624 B1 2/2019 Knudson et al.
10,229,680 B1 3/2019 Gillespie et al.
10,241,754 B1 3/2019 Kadarundalagi Raghuram Doss et al.
10,249,205 B2 4/2019 Hammersley et al.
10,297,256 B2 * 5/2019 Reilly .................... G10L 15/20
10,304,440 B1 5/2019 Panchapagesan et al.
10,304,475 B1 5/2019 Wang et al.
10,318,236 B1 6/2019 Pal et al.
10,332,508 B1 6/2019 Hoffmeister
10,339,957 B1 7/2019 Chenier et al.
10,354,658 B2 7/2019 Wilberding
10,424,296 B2 9/2019 Penilla et al.
10,445,365 B2 10/2019 Luke et al.
10,515,625 B1 12/2019 Metallinou et al.
10,565,998 B2 2/2020 Wilberding
10,565,999 B2 2/2020 Wilberding
10,567,515 B1 2/2020 Bao
10,573,312 B1 2/2020 Thomson et al.
10,580,405 B1 3/2020 Wang et al.
10,586,534 B1 3/2020 Argyropoulos et al.
10,593,328 B1 3/2020 Wang et al.
10,593,330 B2 3/2020 Sharifi
10,600,406 B1 3/2020 Shapiro et al.
10,621,981 B2 4/2020 Sereshki
10,623,811 B1 4/2020 Cwik
10,643,609 B1 5/2020 Pogue et al.
10,685,669 B1 6/2020 Lan et al.
10,699,711 B2 * 6/2020 Reilly .................... G10L 15/02
10,706,843 B1 7/2020 Elangovan et al.
10,720,173 B2 7/2020 Freeman et al.
10,728,196 B2 7/2020 Wang
10,735,870 B2 8/2020 Ballande et al.
10,746,840 B1 8/2020 Barton et al.
10,748,531 B2 8/2020 Kim
10,777,189 B1 9/2020 Fu et al.
10,777,203 B1 9/2020 Pasko
10,789,041 B2 9/2020 Kim et al.
10,797,667 B2 10/2020 Fish et al.
10,824,682 B2 11/2020 Alvares et al.
10,825,471 B2 11/2020 Walley et al.
10,837,667 B2 11/2020 Nelson et al.
10,847,137 B1 11/2020 Mandal et al.
10,847,149 B1 11/2020 Mok et al.
10,847,164 B2 11/2020 Wilberding
10,867,596 B2 12/2020 Yoneda et al.
10,867,604 B2 12/2020 Smith et al.
10,871,943 B1 12/2020 D'Amato
10,878,811 B2 12/2020 Smith et al.
10,878,826 B2 12/2020 Li et al.
10,885,091 B1 1/2021 Meng et al.
10,911,596 B1 2/2021 Do et al.
10,964,314 B2 3/2021 Jazi et al.
11,024,311 B2 6/2021 Mixter et al.
11,025,569 B2 6/2021 Lind et al.
11,050,615 B2 6/2021 Mathews et al.
11,062,705 B2 7/2021 Watanabe et al.
11,100,923 B2 8/2021 Fainberg et al.
11,127,405 B1 9/2021 Antos et al.
11,137,979 B2 10/2021 Plagge
11,138,969 B2 10/2021 D'Amato
11,159,878 B1 10/2021 Chatlani et al.
11,172,328 B2 11/2021 Soto et al.
11,172,329 B2 11/2021 Soto et al.
11,175,880 B2 11/2021 Liu et al.
11,184,704 B2 11/2021 Jarvis et al.
11,184,969 B2 11/2021 Lang
11,189,284 B2 11/2021 Maeng
11,206,052 B1 12/2021 Park et al.
11,212,612 B2 12/2021 Lang et al.
11,264,019 B2 3/2022 Bhattacharya et al.
11,277,512 B1 3/2022 Leeds et al.
11,315,556 B2 4/2022 Smith et al.
11,354,092 B2 6/2022 D'Amato
11,361,763 B1 6/2022 Maas et al.
11,373,645 B1 6/2022 Mathew et al.
11,411,763 B2 8/2022 Mackay et al.

(56) References Cited

U.S. PATENT DOCUMENTS 11,445,301 B2 9/2022 Park et al.
11,475,899 B2 10/2022 Lesso
11,514,898 B2 11/2022 Millington
11,531,520 B2 12/2022 Wilberding
11,580,969 B2 2/2023 Han et al.
11,646,023 B2 5/2023 Smith
11,664,023 B2 * 5/2023 Reilly .................... G10L 15/02 704/251
11,694,689 B2 7/2023 Smith
11,709,653 B1 7/2023 Shin
11,714,600 B2 8/2023 D'Amato
11,727,936 B2 8/2023 Smith
11,790,937 B2 10/2023 Smith et al.
11,817,076 B2 11/2023 Sereshki et al.
2001/0003173 A1 6/2001 Lim
2002/0054685 A1 5/2002 Avendano et al.
2002/0055950 A1 5/2002 Witteman
2002/0143532 A1 10/2002 McLean et al.
2003/0097482 A1 5/2003 DeHart et al.
2004/0153321 A1 8/2004 Chung et al.
2004/0161082 A1 8/2004 Brown et al.
2005/0033582 A1 2/2005 Gadd et al.
2005/0254662 A1 11/2005 Blank et al.
2006/0104454 A1 5/2006 Guitarte Perez et al.
2007/0038461 A1 2/2007 Abbott et al.
2007/0038999 A1 2/2007 Millington
2007/0060054 A1 3/2007 Romesburg
2007/0286426 A1 12/2007 Xiang et al.
2008/0008333 A1 1/2008 Nishikawa et al.
2008/0031466 A1 2/2008 Buck et al.
2008/0144858 A1 6/2008 Khawand et al.
2008/0160977 A1 7/2008 Ahmaniemi et al.
2008/0192946 A1 8/2008 Faller
2008/0291916 A1 11/2008 Xiong et al.
2009/0013255 A1 1/2009 Yuschik et al.
2009/0046866 A1 2/2009 Feng et al.
2009/0113053 A1 4/2009 Van Wie et al.
2009/0214048 A1 8/2009 Stokes, III et al.
2009/0299745 A1 12/2009 Kennewick et al.
2009/0323924 A1 12/2009 Tashev et al.
2010/0041443 A1 2/2010 Yokota
2010/0070276 A1 3/2010 Wasserblat et al.
2010/0179806 A1 7/2010 Zhang et al.
2010/0260348 A1 10/2010 Bhow et al.
2010/0278351 A1 11/2010 Fozunbal et al.
2010/0299639 A1 11/2010 Ramsay et al.
2010/0329472 A1 12/2010 Nakadai et al.
2010/0332236 A1 12/2010 Tan
2011/0019833 A1 1/2011 Kuech et al.
2011/0046952 A1 2/2011 Koshinaka
2011/0131032 A1 6/2011 Yang, et al.
2011/0176687 A1 7/2011 Birkenes
2012/0009906 A1 1/2012 Patterson et al.
2012/0020485 A1 1/2012 Visser et al.
2012/0027218 A1 2/2012 Every et al.
2012/0076308 A1 3/2012 Kuech et al.
2012/0224457 A1 9/2012 Kim et al.
2012/0237047 A1 9/2012 Neal et al.
2012/0245941 A1 9/2012 Cheyer
2012/0265528 A1 10/2012 Gruber et al.
2012/0288100 A1 11/2012 Cho
2013/0051755 A1 2/2013 Brown et al.
2013/0073293 A1 3/2013 Jang et al.
2013/0080167 A1 3/2013 Mozer
2013/0080171 A1 3/2013 Mozer et al.
2013/0129100 A1 5/2013 Sorensen
2013/0185639 A1 7/2013 Lim
2013/0230184 A1 9/2013 Kuech et al.
2013/0238326 A1 9/2013 Kim et al.
2013/0283169 A1 10/2013 Van Wie
2013/0289994 A1 10/2013 Newman et al.
2013/0294611 A1 11/2013 Yoo et al.
2013/0301840 A1 11/2013 Yemdji et al.
2013/0322634 A1 12/2013 Bennett et al.
2013/0336499 A1 12/2013 Beckhardt et al.
2013/0343567 A1 12/2013 Triplett et al.
2014/0056435 A1 2/2014 Kjems et al.
2014/0064476 A1 3/2014 Mani et al.
2014/0108010 A1 4/2014 Maltseff et al.
2014/0122092 A1 5/2014 Goldstein
2014/0126745 A1 5/2014 Dickins et al.
2014/0149118 A1 5/2014 Lee et al.
2014/0159581 A1 6/2014 Pruemmer et al.
2014/0161263 A1 6/2014 Koishida et al.
2014/0167929 A1 6/2014 Shim et al.
2014/0172899 A1 6/2014 Hakkani-Tur et al.
2014/0181199 A1 6/2014 Kumar et al.
2014/0188476 A1 7/2014 Li et al.
2014/0200881 A1 7/2014 Chatlani
2014/0229959 A1 8/2014 Beckhardt et al.
2014/0244269 A1 8/2014 Tokutake
2014/0253676 A1 9/2014 Nagase et al.
2014/0270216 A1 9/2014 Tsilfidis et al.
2014/0278343 A1 9/2014 Tran
2014/0278372 A1 9/2014 Nakadai et al.
2014/0278445 A1 9/2014 Eddington, Jr.
2014/0278933 A1 9/2014 McMillan
2014/0288686 A1 9/2014 Sant et al.
2014/0303969 A1 10/2014 Inose et al.
2014/0324203 A1 10/2014 Coburn, IV et al.
2014/0328490 A1 11/2014 Mohammad et al.
2014/0330896 A1 11/2014 Addala et al.
2014/0334645 A1 11/2014 Yun et al.
2014/0358535 A1 12/2014 Lee et al.
2014/0364089 A1 12/2014 Lienhart et al.
2014/0365225 A1 12/2014 Haiut
2014/0368734 A1 12/2014 Hoffert et al.
2015/0030172 A1 1/2015 Gaensler et al.
2015/0032443 A1 1/2015 Karov et al.
2015/0032456 A1 1/2015 Wait
2015/0039310 A1 2/2015 Clark et al.
2015/0039311 A1 2/2015 Clark et al.
2015/0039317 A1 2/2015 Klein et al.
2015/0058018 A1 2/2015 Georges et al.
2015/0066479 A1 3/2015 Pasupalak et al.
2015/0073807 A1 3/2015 Kumar
2015/0088500 A1 3/2015 Conliffe
2015/0126255 A1 5/2015 Yang et al.
2015/0154953 A1 6/2015 Bapat et al.
2015/0154954 A1 6/2015 Sharifi
2015/0170665 A1 6/2015 Gundeti et al.
2015/0200923 A1 7/2015 Triplett
2015/0215382 A1 7/2015 Arora et al.
2015/0221307 A1 8/2015 Shah et al.
2015/0248885 A1 9/2015 Koulomzin
2015/0279351 A1 10/2015 Nguyen et al.
2015/0356968 A1 12/2015 Rice et al.
2015/0373100 A1 12/2015 Kravets et al.
2015/0382128 A1 12/2015 Ridihalgh et al.
2016/0014536 A1 1/2016 Sheen
2016/0018873 A1 1/2016 Fernald et al.
2016/0027440 A1 1/2016 Gelfenbeyn et al.
2016/0034448 A1 2/2016 Tran
2016/0035337 A1 2/2016 Aggarwal et al.
2016/0055847 A1 2/2016 Dahan
2016/0055850 A1 2/2016 Nakadai et al.
2016/0066087 A1 3/2016 Solbach et al.
2016/0070526 A1 3/2016 Sheen
2016/0077794 A1 3/2016 Kim et al.
2016/0088036 A1 3/2016 Corbin et al.
2016/0093281 A1 3/2016 Kuo et al.
2016/0118048 A1 4/2016 Heide
2016/0134924 A1 5/2016 Bush et al.
2016/0140957 A1 5/2016 Duta et al.
2016/0148612 A1 5/2016 Guo et al.
2016/0148615 A1 5/2016 Lee et al.
2016/0192099 A1 6/2016 Oishi et al.
2016/0212488 A1 7/2016 Os et al.
2016/0217789 A1 7/2016 Lee et al.
2016/0299737 A1 10/2016 Clayton et al.
2016/0335485 A1 11/2016 Kim
2016/0372113 A1 12/2016 David et al.
2016/0379635 A1 12/2016 Page
2017/0025124 A1 1/2017 Mixter et al.

(56) References Cited

U.S. PATENT DOCUMENTS

2017/0032244 A1 2/2017 Kurata
2017/0040002 A1 2/2017 Basson et al.
2017/0053648 A1 2/2017 Chi
2017/0053650 A1 2/2017 Ogawa
2017/0076726 A1 3/2017 Bae
2017/0083606 A1 3/2017 Mohan
2017/0084278 A1 3/2017 Jung
2017/0103748 A1 4/2017 Weissberg et al.
2017/0110130 A1 4/2017 Sharifi et al.
2017/0140750 A1 5/2017 Wang et al.
2017/0140757 A1 5/2017 Penilla et al.
2017/0151930 A1 6/2017 Boesen
2017/0164139 A1 6/2017 Deselaers et al.
2017/0180561 A1 6/2017 Kadiwala et al.
2017/0186425 A1 6/2017 Dawes et al.
2017/0186427 A1 6/2017 Wang et al.
2017/0242656 A1 8/2017 Plagge et al.
2017/0269900 A1 9/2017 Triplett
2017/0269975 A1 9/2017 Wood et al.
2017/0300289 A1 10/2017 Gattis
2017/0300990 A1 10/2017 Tanaka et al.
2017/0329397 A1 11/2017 Lin
2017/0331869 A1 11/2017 Bendahan et al.
2017/0332035 A1 11/2017 Shah et al.
2017/0357390 A1 12/2017 Alonso Ruiz et al.
2017/0364371 A1 12/2017 Nandi et al.
2017/0365247 A1 12/2017 Ushakov
2017/0374552 A1 12/2017 Xia et al.
2018/0012077 A1 1/2018 Laska et al.
2018/0018965 A1 1/2018 Daley
2018/0033429 A1 2/2018 Makke et al.
2018/0033438 A1 2/2018 Toma et al.
2018/0061409 A1 3/2018 Valentine et al.
2018/0096678 A1 4/2018 Zhou et al.
2018/0120947 A1 5/2018 Wells et al.
2018/0137857 A1 5/2018 Zhou et al.
2018/0139512 A1 5/2018 Moran et al.
2018/0152557 A1 5/2018 White et al.
2018/0158454 A1 6/2018 Campbell et al.
2018/0182383 A1 6/2018 Kim et al.
2018/0182397 A1 6/2018 Carbune et al.
2018/0182410 A1 6/2018 Kaskari et al.
2018/0188948 A1 7/2018 Ouyang et al.
2018/0190274 A1 7/2018 Kirazci et al.
2018/0196776 A1 7/2018 Hershko et al.
2018/0199130 A1 7/2018 Jaffe et al.
2018/0211665 A1 7/2018 Park et al.
2018/0233130 A1 8/2018 Kaskari et al.
2018/0233141 A1 8/2018 Solomon et al.
2018/0233142 A1 8/2018 Koishida et al.
2018/0233150 A1 8/2018 Gruenstein et al.
2018/0260680 A1 9/2018 Finkelstein et al.
2018/0261213 A1 9/2018 Arik et al.
2018/0270573 A1 9/2018 Lang et al.
2018/0270575 A1 9/2018 Akutagawa
2018/0286394 A1 10/2018 Li et al.
2018/0286414 A1 10/2018 Ravindran et al.
2018/0293221 A1 10/2018 Finkelstein et al.
2018/0301147 A1 10/2018 Kim
2018/0322891 A1 11/2018 Van Den Oord et al.
2018/0330589 A1 11/2018 Horling
2018/0330727 A1 11/2018 Tulli
2018/0336892 A1 11/2018 Kim et al.
2018/0349093 A1 12/2018 McCarty et al.
2018/0350356 A1 12/2018 Garcia
2018/0350379 A1 12/2018 Wung et al.
2018/0352014 A1 12/2018 Alsina et al.
2018/0352334 A1 12/2018 Family et al.
2018/0356962 A1 12/2018 Corbin
2018/0358019 A1 12/2018 Mont-Reynaud
2019/0019112 A1 1/2019 Gelfenbeyn et al.
2019/0035404 A1 1/2019 Gabel et al.
2019/0037173 A1 1/2019 Lee
2019/0043488 A1 2/2019 Bocklet et al.
2019/0044745 A1 2/2019 Knudson et al.
2019/0051298 A1 2/2019 Lee et al.
2019/0051299 A1 2/2019 Ossowski et al.
2019/0066680 A1 2/2019 Woo et al.
2019/0066687 A1 2/2019 Wood et al.
2019/0066710 A1 2/2019 Bryan et al.
2019/0073999 A1 3/2019 Prémont et al.
2019/0081810 A1 3/2019 Jung
2019/0087455 A1 3/2019 He et al.
2019/0096408 A1 3/2019 Li et al.
2019/0122662 A1 4/2019 Chang et al.
2019/0147860 A1 5/2019 Chen et al.
2019/0156847 A1 5/2019 Bryan et al.
2019/0172467 A1 6/2019 Kim et al.
2019/0172476 A1 6/2019 Wung et al.
2019/0186937 A1 6/2019 Sharifi et al.
2019/0188328 A1 6/2019 Oyenan et al.
2019/0189117 A1 6/2019 Kumar
2019/0206391 A1 7/2019 Busch et al.
2019/0206405 A1 7/2019 Gillespie et al.
2019/0219976 A1 7/2019 Giorgi et al.
2019/0221206 A1 7/2019 Chen et al.
2019/0237089 A1 8/2019 Shin
2019/0244608 A1 8/2019 Choi et al.
2019/0251960 A1 8/2019 Maker et al.
2019/0259408 A1 8/2019 Freeman et al.
2019/0281387 A1 9/2019 Woo et al.
2019/0287536 A1 9/2019 Sharifi et al.
2019/0288970 A1 9/2019 Siddiq
2019/0289367 A1 9/2019 Siddiq
2019/0295542 A1 9/2019 Huang et al.
2019/0295555 A1 9/2019 Wilberding
2019/0295556 A1 9/2019 Wilberding
2019/0311715 A1 10/2019 Pfeffinger et al.
2019/0311718 A1 10/2019 Huber et al.
2019/0311722 A1 10/2019 Caldwell
2019/0318729 A1 10/2019 Chao et al.
2019/0325870 A1 10/2019 Mitic
2019/0325888 A1 10/2019 Geng
2019/0341037 A1 11/2019 Bromand et al.
2019/0341038 A1 11/2019 Bromand et al.
2019/0347063 A1 11/2019 Liu et al.
2019/0348044 A1 11/2019 Chun et al.
2019/0362714 A1 11/2019 Mori et al.
2019/0364422 A1 11/2019 Zhuo
2019/0371310 A1 12/2019 Fox et al.
2019/0371324 A1 12/2019 Powell et al.
2019/0371329 A1 12/2019 D'Souza et al.
2019/0371342 A1 12/2019 Tukka et al.
2019/0392832 A1 12/2019 Mitsui et al.
2020/0043489 A1 2/2020 Bradley et al.
2020/0043494 A1 2/2020 Maeng
2020/0066279 A1 2/2020 Kang et al.
2020/0074990 A1 3/2020 Kim et al.
2020/0075018 A1 3/2020 Chen
2020/0090647 A1 3/2020 Kurtz
2020/0098354 A1 3/2020 Lin et al.
2020/0098379 A1 3/2020 Tai et al.
2020/0105245 A1 4/2020 Gupta et al.
2020/0105264 A1 4/2020 Jang et al.
2020/0110571 A1 4/2020 Liu et al.
2020/0125162 A1 4/2020 D'Amato et al.
2020/0135194 A1 4/2020 Jeong
2020/0135224 A1 4/2020 Bromand et al.
2020/0152206 A1 5/2020 Shen et al.
2020/0167597 A1 5/2020 Nguyen et al.
2020/0184964 A1 6/2020 Myers et al.
2020/0211539 A1 7/2020 Lee
2020/0211550 A1 7/2020 Pan et al.
2020/0234709 A1 7/2020 Kunitake
2020/0244650 A1 7/2020 Burris et al.
2020/0251107 A1 8/2020 Wang et al.
2020/0265838 A1 8/2020 Lee et al.
2020/0265842 A1 8/2020 Singh
2020/0310751 A1 10/2020 Anand et al.
2020/0342869 A1 10/2020 Lee et al.
2020/0364026 A1 11/2020 Lee et al.
2020/0366477 A1 11/2020 Brown et al.
2020/0409926 A1 12/2020 Srinivasan et al.
2021/0029452 A1 1/2021 Tsoi et al.

(56) References Cited

U.S. PATENT DOCUMENTS

| | | | |
|---|---|---|---|
| 2021/0067867 | A1 | 3/2021 | Kagoshima |
| 2021/0118439 | A1 | 4/2021 | Schillmoeller et al. |
| 2021/0157542 | A1 | 5/2021 | De Assis et al. |
| 2021/0166680 | A1 | 6/2021 | Jung et al. |
| 2021/0183366 | A1 | 6/2021 | Reinspach et al. |
| 2021/0239831 | A1 | 8/2021 | Shin et al. |
| 2021/0249004 | A1 | 8/2021 | Smith |
| 2021/0280185 | A1 | 9/2021 | Tan et al. |
| 2021/0295849 | A1 | 9/2021 | Van Der Ven et al. |
| 2021/0358481 | A1 | 11/2021 | D'Amato et al. |
| 2022/0035514 | A1 | 2/2022 | Shin et al. |
| 2022/0036882 | A1 | 2/2022 | Ahn et al. |
| 2022/0050585 | A1 | 2/2022 | Fettes et al. |
| 2022/0083136 | A1 | 3/2022 | DeLeeuw |
| 2022/0301561 | A1 | 9/2022 | Robert Jose et al. |
| 2023/0019595 | A1 | 1/2023 | Smith |
| 2023/0215433 | A1 | 7/2023 | Myers et al. |
| 2023/0237998 | A1 | 7/2023 | Smith et al. |
| 2023/0274738 | A1 | 8/2023 | Smith et al. |
| 2023/0382349 | A1 | 11/2023 | Ham |

FOREIGN PATENT DOCUMENTS

| | | | |
|---|---|---|---|
| CN | 1781291 | A | 5/2006 |
| CN | 101427154 | A | 5/2009 |
| CN | 102999161 | A | 3/2013 |
| CN | 104115224 | A | 10/2014 |
| CN | 104155938 | A | 11/2014 |
| CN | 104282305 | A | 1/2015 |
| CN | 104520927 | A | 4/2015 |
| CN | 104572009 | A | 4/2015 |
| CN | 104581510 | A | 4/2015 |
| CN | 104885406 | A | 9/2015 |
| CN | 104885438 | A | 9/2015 |
| CN | 105101083 | A | 11/2015 |
| CN | 105162886 | A | 12/2015 |
| CN | 105284168 | A | 1/2016 |
| CN | 105389099 | A | 3/2016 |
| CN | 105427861 | A | 3/2016 |
| CN | 105453179 | A | 3/2016 |
| CN | 105472191 | A | 4/2016 |
| CN | 105493179 | A | 4/2016 |
| CN | 105632486 | A | 6/2016 |
| CN | 105679318 | A | 6/2016 |
| CN | 106030699 | A | 10/2016 |
| CN | 106796784 | A | 5/2017 |
| CN | 106910500 | A | 6/2017 |
| CN | 107122158 | A | 9/2017 |
| CN | 107465974 | A | 12/2017 |
| CN | 107644313 | A | 1/2018 |
| CN | 107767863 | A | 3/2018 |
| CN | 107832837 | A | 3/2018 |
| CN | 107919116 | A | 4/2018 |
| CN | 108028047 | A | 5/2018 |
| CN | 108028048 | A | 5/2018 |
| CN | 108198548 | A | 6/2018 |
| CN | 109712626 | A | 5/2019 |
| EP | 2051542 | A1 | 4/2009 |
| EP | 2986034 | A1 | 2/2016 |
| EP | 3133595 | A1 | 2/2017 |
| EP | 3142107 | A1 | 3/2017 |
| GB | 2501367 | A | 10/2013 |
| JP | S63301998 | A | 12/1988 |
| JP | H0883091 | A | 3/1996 |
| JP | 2004096520 | A | 3/2004 |
| JP | 2004109361 | A | 4/2004 |
| JP | 2004163590 | A | 6/2004 |
| JP | 2007235875 | A | 9/2007 |
| JP | 2008217444 | A | 9/2008 |
| JP | 2014510481 | A | 4/2014 |
| JP | 2016009193 | A | 1/2016 |
| JP | 2017129860 | A | 7/2017 |
| JP | 2017227912 | A | 12/2017 |
| JP | 2018055259 | A | 4/2018 |
| JP | 2019109510 | A | 7/2019 |
| KR | 101284134 | B1 | 7/2013 |
| KR | 20140005410 | A | 1/2014 |
| KR | 20140054643 | A | 5/2014 |
| KR | 20140111859 | A | 9/2014 |
| TW | 201629950 | A | 8/2016 |
| WO | 03054854 | A2 | 7/2003 |
| WO | 2008096414 | A1 | 8/2008 |
| WO | 2015105788 | A1 | 7/2015 |
| WO | 2015133022 | A1 | 9/2015 |
| WO | 2015195216 | A1 | 12/2015 |
| WO | 2016003509 | A1 | 1/2016 |
| WO | 2016014686 | | 1/2016 |
| WO | 2016014686 | A1 | 1/2016 |
| WO | 2016136062 | A1 | 9/2016 |
| WO | 2018027142 | A1 | 2/2018 |
| WO | 2018064362 | A1 | 4/2018 |
| WO | 2018140777 | A1 | 8/2018 |
| WO | 2019005772 | A1 | 1/2019 |
| WO | 2020061439 | A1 | 3/2020 |
| WO | 2020068795 | A1 | 4/2020 |
| WO | 2020132298 | A1 | 6/2020 |

OTHER PUBLICATIONS

Final Office Action mailed on Oct. 6, 2023, issued in connection with U.S. Appl. No. 17/532,744, filed Nov. 22, 2021, 21 pages.

Final Office Action mailed on Jun. 7, 2022, issued in connection with U.S. Appl. No. 16/736,725, filed Jan. 7, 2020, 14 pages.

Final Office Action mailed on Aug. 9, 2023, issued in connection with U.S. Appl. No. 17/493,430, filed Oct. 4, 2021, 19 pages.

*Google LLC* v. *Sonos, Inc.*, International Trade Commission Case No. 337-TA-1330, Order No. 25: Regarding Respondent Sonos, Inc.'s Omnibus Motion for Summary Determination; dated May 16, 2023, 7 pages.

*Google LLC* v. *Sonos, Inc.*, International Trade Commission Case No. 337-TA-1330, Order No. 28: Regarding Respondent Sonos, Inc.'s Omnibus Motion for Summary Determination; dated May 22, 2023, 3 pages.

*Google LLC* v. *Sonos, Inc.*, International Trade Commission Case No. 337-TA-1330, Order No. 37: Regarding Complainant Google LLC's Motions in Limine; dated Jul. 7, 2023, 10 pages.

*Google LLC* v. *Sonos, Inc.*, International Trade Commission Case No. 337-TA-1330, Respondent Sonos, Inc.'s Motion in Limine No. 4. Motion to Exclude Untimely Validity Arguments Regarding Claim 11 of U.S. Pat. No. 11,024,311; dated Jun. 13, 2023, 34 pages.

*Google LLC* v. *Sonos, Inc.*, International Trade Commission Case No. 337-TA-1330, Respondent Sonos, Inc.'s Response to Google's Motion in Limine No. 3 Preclude Sonos from Presenting Evidence or Argument that Claim 3 of the '748 Patent is Indefinite for Lack of Antecedent Basis; dated Jun. 12, 2023, 26 pages.

Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.

Indian Patent Office, Examination Report mailed on Dec. 5, 2023, issued in connection with Indian Patent Application No. 201847035625, 3 pages.

International Bureau, International Preliminary Report on Patentability and Written Opinion, mailed on Aug. 10, 2021, issued in connection with International Application No. PCT/US2020/017150, filed on Feb. 7, 2020, 20 pages.

International Bureau, International Preliminary Report on Patentability and Written Opinion, mailed on Mar. 10, 2020, issued in connection with International Application No. PCT/US2018/050050, filed on Sep. 7, 2018, 7 pages.

International Bureau, International Preliminary Report on Patentability and Written Opinion, mailed on Jan. 15, 2019, issued in connection with International Application No. PCT/US2017/042170, filed on Jul. 14, 2017, 7 pages.

(56) References Cited

OTHER PUBLICATIONS

International Bureau, International Preliminary Report on Patentability and Written Opinion, mailed on Jan. 15, 2019, issued in connection with International Application No. PCT/US2017/042227, filed on Jul. 14, 2017, 7 pages.
International Bureau, International Preliminary Report on Patentability and Written Opinion, mailed on Aug. 27, 2019, issued in connection with International Application No. PCT/US2018/019010, filed on Feb. 21, 2018, 9 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Jul. 24, 2018, issued in connection with International Application No. PCT/US2018/019010, filed on Feb. 21, 2018, 12 pages.
International Bureau, International Search Report and Written Opinion, mailed on Feb. 27, 2019, issued in connection with International Application No. PCT/US2018/053123, filed on Sep. 27, 2018, 16 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Oct. 6, 2017, issued in connection with International Application No. PCT/US2017/045551, filed on Aug. 4, 2017, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Nov. 28, 2021, issued in connection with Japanese Patent Application No. 2020-550102, 9 pages.
Japanese Patent Office, Notice of Reasons for Refusal and Translation mailed on Aug. 8, 2023, issued in connection with Japanese Patent Application No. 2022-101346, 6 pages.
Japanese Patent Office, Office Action and Translation mailed on Nov. 15, 2022, issued in connection with Japanese Patent Application No. 2021-146144, 9 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Jul. 19, 2023, issued in connection with Korean Application No. 10-2022-7024007, 9 pages.
Non-Final Office Action mailed on Mar. 23, 2022, issued in connection with U.S. Appl. No. 16/907,953, filed Jun. 22, 2020, 7 pages.
Non-Final Office Action mailed on Oct. 23, 2023, issued in connection with U.S. Appl. No. 17/932,715, filed Sep. 16, 2022, 14 pages.
Non-Final Office Action mailed on Sep. 23, 2022, issued in connection with U.S. Appl. No. 16/153,530, filed Oct. 5, 2018, 25 pages.

(56) References Cited

OTHER PUBLICATIONS

Non-Final Office Action mailed on Apr. 24, 2023, issued in connection with U.S. Appl. No. 17/532,744, filed Nov. 22, 2021, 18 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on Jan. 26, 2024, issued in connection with U.S. Appl. No. 17/450,925, filed Oct. 14, 2021, 9 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Aug. 28, 2023, issued in connection with U.S. Appl. No. 17/722,661, filed Apr. 18, 2022, 16 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Nov. 29, 2021, issued in connection with U.S. Appl. No. 16/989,350, filed Aug. 10, 2020, 15 pages.
Non-Final Office Action mailed on Jul. 3, 2023, issued in connection with U.S. Appl. No. 17/135,173, filed Dec. 28, 2020, 22 pages.
Non-Final Office Action mailed on Sep. 30, 2022, issued in connection with U.S. Appl. No. 17/353,254, filed Jun. 21, 2021, 22 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.
Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Oct. 6, 2023, issued in connection with U.S. Appl. No. 17/222,950, filed Apr. 5, 2021, 9 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Sep. 7, 2023, issued in connection with U.S. Appl. No. 17/340,590, filed Jun. 7, 2021, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Aug. 4, 2021, issued in connection with U.S. Appl. No. 16/780,483, filed Feb. 3, 2020, 5 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
Notice of Allowance mailed on Jan. 9, 2023, issued in connection with U.S. Appl. No. 17/247,507, filed Dec. 14, 2020, 8 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Advisory Action mailed on Nov. 7, 2022, issued in connection with U.S. Appl. No. 16/168,389, filed Oct. 23, 2018, 4 pages.
Advisory Action mailed on Aug. 13, 2021, issued in connection with U.S. Appl. No. 16/271,550, filed Feb. 8, 2019, 4 pages.
Advisory Action mailed on Dec. 13, 2023, issued in connection with U.S. Appl. No. 18/048,034, filed Oct. 20, 2022, 4 pages.
Advisory Action mailed on Feb. 28, 2022, issued in connection with U.S. Appl. No. 16/813,643, filed Mar. 9, 2020, 3 pages.
Advisory Action mailed on Sep. 8, 2021, issued in connection with U.S. Appl. No. 16/168,389, filed Oct. 23, 2018, 4 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Audhkhasi Kartik et al. End-to-end ASR-free keyword search from speech. 2017 IEEE International Conference on Acoustics, Speech and Signal Processing, Mar. 5, 2017, 7 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 25, 2023, issued in connection with Australian Application No. 2018338812, 3 pages.

(56) References Cited

OTHER PUBLICATIONS

Australian Patent Office, Australian Examination Report Action mailed on Sep. 28, 2022, issued in connection with Australian Application No. 2018338812, 3 pages.
Australian Patent Office, Australian Examination Report Action mailed on Oct. 31, 2023, issued in connection with Australian Application No. 2023203687, 2 pages.
Australian Patent Office, Australian Examination Report Action mailed on Mar. 4, 2022, issued in connection with Australian Application No. 2021202786, 2 pages.
Canadian Patent Office, Canadian Examination Report mailed on Dec. 1, 2021, issued in connection with Canadian Application No. 3096442, 4 pages.
Canadian Patent Office, Canadian Examination Report mailed on Oct. 12, 2023, issued in connection with Canadian Application No. 3084279, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Dec. 19, 2023, issued in connection with Canadian Application No. 3067776, 3 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jan. 3, 2024, issued in connection with Canadian Application No. 3123601, 3 pages.
Canadian Patent Office, Canadian Examination Report mailed on Jun. 7, 2022, issued in connection with Canadian Application No. 3105494, 5 pages.
Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Chinese Patent Office, First Office Action and Translation mailed on Sep. 19, 2022, issued in connection with Chinese Application No. 201980056604.9, 13 pages.
Chinese Patent Office, First Office Action and Translation mailed on Dec. 20, 2021, issued in connection with Chinese Application No. 202010302650.7, 10 pages.
Chinese Patent Office, First Office Action and Translation mailed on Nov. 25, 2022, issued in connection with Chinese Application No. 201780056321.5, 8 pages.
Chinese Patent Office, First Office Action and Translation mailed on Feb. 27, 2023, issued in connection with Chinese Application No. 201980003798.6, 12 pages.
Chinese Patent Office, First Office Action and Translation mailed on Dec. 30, 2022, issued in connection with Chinese Application No. 201880076775.3, 10 pages.
Chinese Patent Office, First Office Action and Translation mailed on Sep. 6, 2023, issued in connection with Chinese Application No. 202010179593.8, 14 pages.
Chinese Patent Office, Second Office Action and Translation mailed on Mar. 3, 2022, issued in connection with Chinese Application No. 201880077216.4, 11 pages.
Chinese Patent Office, Second Office Action and Translation mailed on Apr. 1, 2023, issued in connection with Chinese Application No. 201980056604.9, 11 pages.
Chinese Patent Office, Second Office Action mailed on Dec. 21, 2022, issued in connection with Chinese Application No. 201980089721.5, 12 pages.
Chinese Patent Office, Second Office Action mailed on May 30, 2023, issued in connection with Chinese Application No. 201980070006.7, 9 pages.
Chung et al. Empirical Evaluation of Gated Recurrent Neural Network on Sequence Modeling. Dec. 11, 2014, 9 pages.
Couke et al. Efficient Keyword Spotting using Dilated Convolutions and Gating, arXiv:1811.07684v2, Feb. 18, 2019, 5 pages.
European Patent Office, Decision to Refuse European Patent Application mailed on May 30, 2022, issued in connection with European Application No. 17200837.7, 4 pages.
European Patent Office, European EPC Article 94.3 mailed on Jun. 5, 2023, issued in connection with European Application No. 20710649.3, 8 pages.
European Patent Office, European EPC Article 94.3 mailed on Feb. 10, 2023, issued in connection with European Application No. 19729968.8, 7 pages.
European Patent Office, European EPC Article 94.3 mailed on Jan. 10, 2024, issued in connection with European Application No. 20757152.2, 6 pages.
European Patent Office, European EPC Article 94.3 mailed on Mar. 11, 2022, issued in connection with European Application No. 19731415.6, 7 pages.
European Patent Office, European EPC Article 94.3 mailed on Nov. 11, 2021, issued in connection with European Application No. 19784172.9, 5 pages.
European Patent Office, European EPC Article 94.3 mailed on Oct. 12, 2023, issued in connection with European Application No. 20736489.4, 8 pages.
Notice of Allowance mailed on Nov. 9, 2022, issued in connection with U.S. Appl. No. 17/385,542, filed Jul. 26, 2021, 8 pages.
Notice of Allowance mailed on Feb. 1, 2022, issued in connection with U.S. Appl. No. 16/439,046, filed Jun. 12, 2019, 9 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Aug. 11, 2023, issued in connection with U.S. Appl. No. 17/878,649, filed Aug. 1, 2022, 7 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Aug. 12, 2021, issued in connection with U.S. Appl. No. 16/819,755, filed Mar. 16, 2020, 6 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2023, issued in connection with U.S. Appl. No. 17/453,632, filed Nov. 4, 2021, 9 pages.

(56) References Cited

OTHER PUBLICATIONS

Notice of Allowance mailed on Apr. 13, 2022, issued in connection with U.S. Appl. No. 17/236,559, filed Apr. 21, 2021, 7 pages.
Notice of Allowance mailed on Dec. 13, 2021, issued in connection with U.S. Appl. No. 16/879,553, filed May 20, 2020, 15 pages.
Notice of Allowance mailed on Feb. 13, 2023, issued in connection with U.S. Appl. No. 18/045,360, filed Oct. 10, 2022, 9 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Aug. 14, 2023, issued in connection with U.S. Appl. No. 17/549,034, filed Dec. 13, 2021, 9 pages.
Notice of Allowance mailed on Dec. 14, 2023, issued in connection with U.S. Appl. No. 17/722,661, filed Apr. 18, 2022, 12 pages.
Notice of Allowance mailed on Jan. 14, 2022, issued in connection with U.S. Appl. No. 16/966,397, filed Jul. 30, 2020, 5 pages.
Notice of Allowance mailed on Sep. 14, 2023, issued in connection with U.S. Appl. No. 18/061,579, filed Dec. 5, 2022, 7 pages.
Notice of Allowance mailed on Aug. 15, 2022, issued in connection with U.S. Appl. No. 17/101,949, filed Nov. 23, 2020, 11 pages.
Notice of Allowance mailed on Dec. 15, 2023, issued in connection with U.S. Appl. No. 18/157,937, filed Jan. 23, 2023, 8 pages.
Notice of Allowance mailed on Feb. 15, 2023, issued in connection with U.S. Appl. No. 17/659,613, filed Apr. 18, 2022, 21 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725, filed Jan. 1, 2020, 11 pages.
Notice of Allowance mailed on Aug. 16, 2023, issued in connection with U.S. Appl. No. 17/536,572, filed Nov. 29, 2021, 7 pages.
Notice of Allowance mailed on Aug. 17, 2022, issued in connection with U.S. Appl. No. 17/135,347, filed Dec. 28, 2020, 14 pages.
Notice of Allowance mailed on Nov. 17, 2022, issued in connection with U.S. Appl. No. 17/486,222, filed Sep. 27, 2021, 10 pages.
Notice of Allowance mailed on Jul. 18, 2022, issued in connection with U.S. Appl. No. 17/222,151, filed Apr. 5, 2021, 5 pages.
Notice of Allowance mailed on Dec. 2, 2021, issued in connection with U.S. Appl. No. 16/841,116, filed Apr. 6, 2020, 5 pages.
Notice of Allowance mailed on Oct. 2, 2023, issued in connection with U.S. Appl. No. 17/810,533, filed Jul. 1, 2022, 8 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Aug. 21, 2023, issued in connection with U.S. Appl. No. 17/548,921, filed Dec. 13, 2021, 10 pages.
Notice of Allowance mailed on Dec. 21, 2021, issued in connection with U.S. Appl. No. 16/271,550, filed Feb. 8, 2019, 11 pages.
Notice of Allowance mailed on Jul. 21, 2023, issued in connection with U.S. Appl. No. 17/986,241, filed Nov. 14, 2022, 12 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Sep. 21, 2022, issued in connection with U.S. Appl. No. 17/128,949, filed Dec. 21, 2020, 8 pages.
European Patent Office, European EPC Article 94.3 mailed on Dec. 18, 2023, issued in connection with European Application No. 21703134.3, 7 pages.
European Patent Office, European EPC Article 94.3 mailed on May 2, 2022, issued in connection with European Application No. 20185599.6, 7 pages.
European Patent Office, European EPC Article 94.3 mailed on Jun. 21, 2022, issued in connection with European Application No. 19780508.8, 5 pages.
European Patent Office, European EPC Article 94.3 mailed on Feb. 23, 2023, issued in connection with European Application No. 19839734.1, 8 pages.
European Patent Office, European EPC Article 94.3 mailed on Jan. 24, 2024, issued in connection with European Application No. 21180778.9, 8 pages.
European Patent Office, European EPC Article 94.3 mailed on Jun. 27, 2023, issued in connection with European Application No. 21195031.6, 4 pages.
European Patent Office, European EPC Article 94.3 mailed on Nov. 27, 2023, issued in connection with European Application No. 19780508.8, 7 pages.
European Patent Office, European EPC Article 94.3 mailed on Nov. 28, 2022, issued in connection with European Application No. 18789515.6, 7 pages.
European Patent Office, European EPC Article 94.3 mailed on Nov. 28, 2023, issued in connection with European Application No. 19731415.6, 9 pages.
European Patent Office, European EPC Article 94.3 mailed on Mar. 29, 2023, issued in connection with European Application No. 22182193.7, 4 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European EPC Article 94.3 mailed on Aug. 31, 2023, issued in connection with European Application No. 19773326.4, 5 pages.
European Patent Office, European EPC Article 94.3 mailed on Jul. 31, 2023, issued in connection with European Application No. 21164130.3, 5 pages.
European Patent Office, European EPC Article 94.3 mailed on Apr. 6, 2023, issued in connection with European Application No. 21193616.6, 7 pages.
European Patent Office, European EPC Article 94.3 mailed on Sep. 6, 2023, issued in connection with European Application No. 19197116.7, 4 pages.
European Patent Office, European EPC Article 94.3 mailed on Sep. 7, 2023, issued in connection with European Application No. 20185599.6, 6 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Jan. 2, 2024, issued in connection with European Application No. 23188226.7, 10 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Jun. 30, 2022, issued in connection with European Application No. 21212763.3, 9 pages.
European Patent Office, European Extended Search Report mailed on Jul. 8, 2022, issued in connection with European Application No. 22153523.0, 9 pages.

(56) References Cited

OTHER PUBLICATIONS

European Patent Office, European Search Report mailed on Mar. 1, 2022, issued in connection with European Application No. 21180778.9, 9 pages.
European Patent Office, European Search Report mailed on Feb. 2, 2024, issued in connection with European Application No. 23200723.7, 5 pages.
European Patent Office, European Search Report mailed on Oct. 4, 2022, issued in connection with European Application No. 22180226.7, 6 pages.
European Patent Office, European Search Report mailed on Sep. 21, 2023, issued in connection with European Application No. 23172783.5, 8 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Final Office Action mailed Jul. 23, 2021, issued in connection with U.S. Appl. No. 16/439,046, filed Jun. 12, 2019, 12 pages.
Final Office Action mailed on Jun. 1, 2022, issued in connection with U.S. Appl. No. 16/806,747, filed Mar. 2, 2020, 20 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on Mar. 21, 2022, issued in connection with U.S. Appl. No. 16/153,530, filed Oct. 5, 2018, 23 pages.
Final Office Action mailed on Aug. 22, 2022, issued in connection with U.S. Appl. No. 16/168,389, filed Oct. 23, 2018, 37 pages.
Final Office Action mailed on Aug. 22, 2023, issued in connection with U.S. Appl. No. 18/061,570, filed Dec. 5, 2022, 12 pages.
Final Office Action mailed on Aug. 25, 2023, issued in connection with U.S. Appl. No. 16/989,350, filed Aug. 10, 2020, 21 pages.
Final Office Action mailed on Jul. 27, 2022, issued in connection with U.S. Appl. No. 16/989,350, filed Aug. 10, 2020, 15 pages.
Final Office Action mailed on Sep. 27, 2023, issued in connection with U.S. Appl. No. 18/048,034, filed Oct. 20, 2022, 9 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Oct. 4, 2021, issued in connection with U.S. Appl. No. 16/806,747, filed Mar. 2, 2020, 17 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Jul. 26, 2022, issued in connection with Korean Application No. 10-2022-7016656, 17 pages.
Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Korean Preliminary Rejection and Translation mailed on Dec. 26, 2023, issued in connection with Korean Application No. 10-2023-7031855, 4 pages.
Korean Patent Office, Korean Preliminary Rejection and Translation mailed on Dec. 5, 2023, issued in connection with Korean Application No. 10-2023-7032988, 11 pages.
Korean Patent Office, Office Action and Translation mailed on Feb. 27, 2023, issued in connection with Korean Application No. 10-2022-7021879, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Mathias Wolfel. Channel Selection by Class Separability Measures for Automatic Transcriptions on Distant Microphones, Interspeech 2007 10.21437/Interspeech.2007-255, 4 pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Non-Final Office Action mailed Jul. 22, 2021, issued in connection with U.S. Appl. No. 16/179,779, filed Nov. 2, 2018, 19 pages.
Non-Final Office Action mailed on Feb. 2, 2023, issued in connection with U.S. Appl. No. 17/305,698, filed Jul. 13, 2021, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Feb. 1, 2024, issued in connection with U.S. Appl. No. 18/313,013, filed May 5, 2023, 47 pages.
Non-Final Office Action mailed on Aug. 10, 2023, issued in connection with U.S. Appl. No. 18/070,024, filed Nov. 28, 2022, 4 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2022, issued in connection with U.S. Appl. No. 17/145,667, filed Jan. 11, 2021, 9 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 13, 2023, issued in connection with U.S. Appl. No. 18/316,400, filed May 12, 2023, 6 pages.
Non-Final Office Action mailed on Dec. 13, 2023, issued in connection with U.S. Appl. No. 18/316,434, filed May 12, 2023, 29 pages.

(56) References Cited

OTHER PUBLICATIONS

Non-Final Office Action mailed on Oct. 13, 2021, issued in connection with U.S. Appl. No. 16/679,538, filed Nov. 11, 2019, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2022, issued in connection with U.S. Appl. No. 17/446,690, filed Sep. 1, 2021, 10 pages.
Non-Final Office Action mailed on Sep. 14, 2023, issued in connection with U.S. Appl. No. 17/528,843, filed Nov. 17, 2021, 20 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Aug. 18, 2021, issued in connection with U.S. Appl. No. 16/845,946, filed Apr. 10, 2020, 14 pages.
Non-Final Office Action mailed on Jan. 18, 2024, issued in connection with U.S. Appl. No. 18/048,034, filed Oct. 20, 2022, 10 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2022, issued in connection with U.S. Appl. No. 16/949,973, filed Nov. 23, 2020, 31 pages.
Non-Final Office Action mailed on Jan. 19, 2024, issued in connection with U.S. Appl. No. 18/331,580, filed Jun. 8, 2023, 11 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2021, issued in connection with U.S. Appl. No. 16/947,895, filed Aug. 24, 2020, 16 pages.
Non-Final Office Action mailed on Apr. 20, 2023, issued in connection with U.S. Appl. No. 18/061,570, filed Dec. 5, 2022, 12 pages.
Non-Final Office Action mailed on Oct. 20, 2022, issued in connection with U.S. Appl. No. 17/532,674, filed Nov. 22, 2021, 52 pages.
Non-Final Office Action mailed on Nov. 21, 2023, issued in connection with U.S. Appl. No. 18/088,976, filed Dec. 27, 2022, 9 pages.
Non-Final Office Action mailed on Dec. 22, 2022, issued in connection with U.S. Appl. No. 16/168,389, filed Oct. 23, 2018, 39 pages.
Non-Final Office Action mailed on Jun. 23, 2023, issued in connection with U.S. Appl. No. 18/048,945, filed Oct. 24, 2022, 10 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Xiaoguang et al. "Robust Small-Footprint Keyword Spotting Using Sequence-To-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection And Channel Weighting. The Institute of Electronics, Information and Communication Engineers, arXiv:1604.03276v1 [cs. SD] Jan. 1, 2010, 8 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Mar. 24, 2022, issued in connection with U.S. Appl. No. 16/378,516, filed Apr. 8, 2019, 7 pages.
Notice of Allowance mailed on Nov. 24, 2023, issued in connection with U.S. Appl. No. 18/070,024, filed Nov. 28, 2022, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2022, issued in connection with U.S. Appl. No. 17/145,667, filed Jan. 11, 2021, 8 pages.
Notice of Allowance mailed on Oct. 26, 2022, issued in connection with U.S. Appl. No. 17/486,574, filed Sep. 27, 2021, 11 pages.
Notice of Allowance mailed on Jun. 27, 2022, issued in connection with U.S. Appl. No. 16/812,758, filed Mar. 9, 2020, 16 pages.
Notice of Allowance mailed on Sep. 27, 2023, issued in connection with U.S. Appl. No. 17/656,794, filed Mar. 28, 2022, 11 pages.
Notice of Allowance mailed on Sep. 27, 2023, issued in connection with U.S. Appl. No. 18/048,945, filed Oct. 24, 2022, 9 pages.
Notice of Allowance mailed on Sep. 27, 2023, issued in connection with U.S. Appl. No. 18/061,243, filed Dec. 2, 2022, 8 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2022, issued in connection with U.S. Appl. No. 17/327,911, filed May 24, 2021, 14 pages.
Notice of Allowance mailed on Jul. 29, 2022, issued in connection with U.S. Appl. No. 17/236,559, filed Apr. 21, 2021, 6 pages.
Notice of Allowance mailed on Mar. 29, 2023, issued in connection with U.S. Appl. No. 17/722,438, filed Apr. 18, 2022, 7 pages.
Notice of Allowance mailed on Sep. 29, 2021, issued in connection with U.S. Appl. No. 16/876,493, filed May 18, 2020, 5 pages.
Notice of Allowance mailed on Sep. 29, 2023, issued in connection with U.S. Appl. No. 16/168,389, filed Oct. 23, 2018, 11 pages.
Notice of Allowance mailed on Mar. 3, 2022, issued in connection with U.S. Appl. No. 16/679,538, filed Nov. 11, 2019, 7 pages.
Notice of Allowance mailed on Jun. 30, 2023, issued in connection with U.S. Appl. No. 17/303,001, filed May 18, 2021, 8 pages.
Notice of Allowance mailed on Mar. 30, 2023, issued in connection with U.S. Appl. No. 17/303,066, filed May 19, 2021, 7 pages.
Notice of Allowance mailed on Aug. 31, 2023, issued in connection with U.S. Appl. No. 18/145,520, filed Dec. 22, 2022, 2 pages.
Notice of Allowance mailed on Mar. 31, 2023, issued in connection with U.S. Appl. No. 17/303,735, filed Jun. 7, 2021, 19 pages.
Notice of Allowance mailed on Aug. 4, 2023, issued in connection with U.S. Appl. No. 18/145,520, filed Dec. 22, 2022, 10 pages.

(56) References Cited

OTHER PUBLICATIONS

Notice of Allowance mailed on Apr. 5, 2023, issued in connection with U.S. Appl. No. 17/549,253, filed Dec. 13, 2021, 10 pages.
Notice of Allowance mailed on Mar. 6, 2023, issued in connection with U.S. Appl. No. 17/449,926, filed Oct. 4, 2021, 8 pages.
Notice of Allowance mailed on Apr. 8, 2022, issued in connection with U.S. Appl. No. 16/813,643, filed Mar. 9, 2020, 7 pages.
Notice of Allowance mailed on Nov. 8, 2021, issued in connection with U.S. Appl. No. 17/008,104, filed Aug. 31, 2020, 9 pages.
Notice of Allowance mailed on Nov. 8, 2023, issued in connection with U.S. Appl. No. 18/066,093, filed Dec. 14, 2022, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Oord et al. WaveNet: A Generative Model for Raw Audio. Arxiv. org, Cornell University Library, Sep. 12, 2016, 15 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision mailed on Jan. 18, 2022, issued in connection with U.S. Appl. No. 16/806,747, filed Mar. 2, 2020, 2 pages.
Renato De Mori. Spoken Language Understanding: A Survey. Automatic Speech Recognition & Understanding, 2007. IEEE, Dec. 1, 2007, 56 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Snips: How to Snips—Assistant creation Installation, Jun. 26, 2017, 6 pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Tsung-Hsien Wen et al: "A Network-based End-to-End Trainable Task-oriented Dialogue System", CORR (ARXIV), vol. 1604. 04562v1, Apr. 15, 2016 (Apr. 15, 2016), pp. 1-11.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.

* cited by examiner

VOICE DETECTION BY MULTIPLE DEVICES

CROSS-REFERENCE TO RELATED APPLICATIONS

This application is a continuation of U.S. patent application Ser. No. 16/915,234, filed Jun. 29, 2020, now U.S. Pat. No. 11,664,023, which is a continuation of U.S. patent application Ser. No. 16/416,752, filed May 20, 2019, now U.S. Pat. No. 10,699,711, which is a continuation of U.S. patent application Ser. No. 16/214,666, filed Dec. 10, 2018, now U.S. Pat. No. 10,297,256, which is a continuation of U.S. patent application Ser. No. 15/211,748, filed Jul. 15, 2016, now U.S. Pat. No. 10,152,969, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
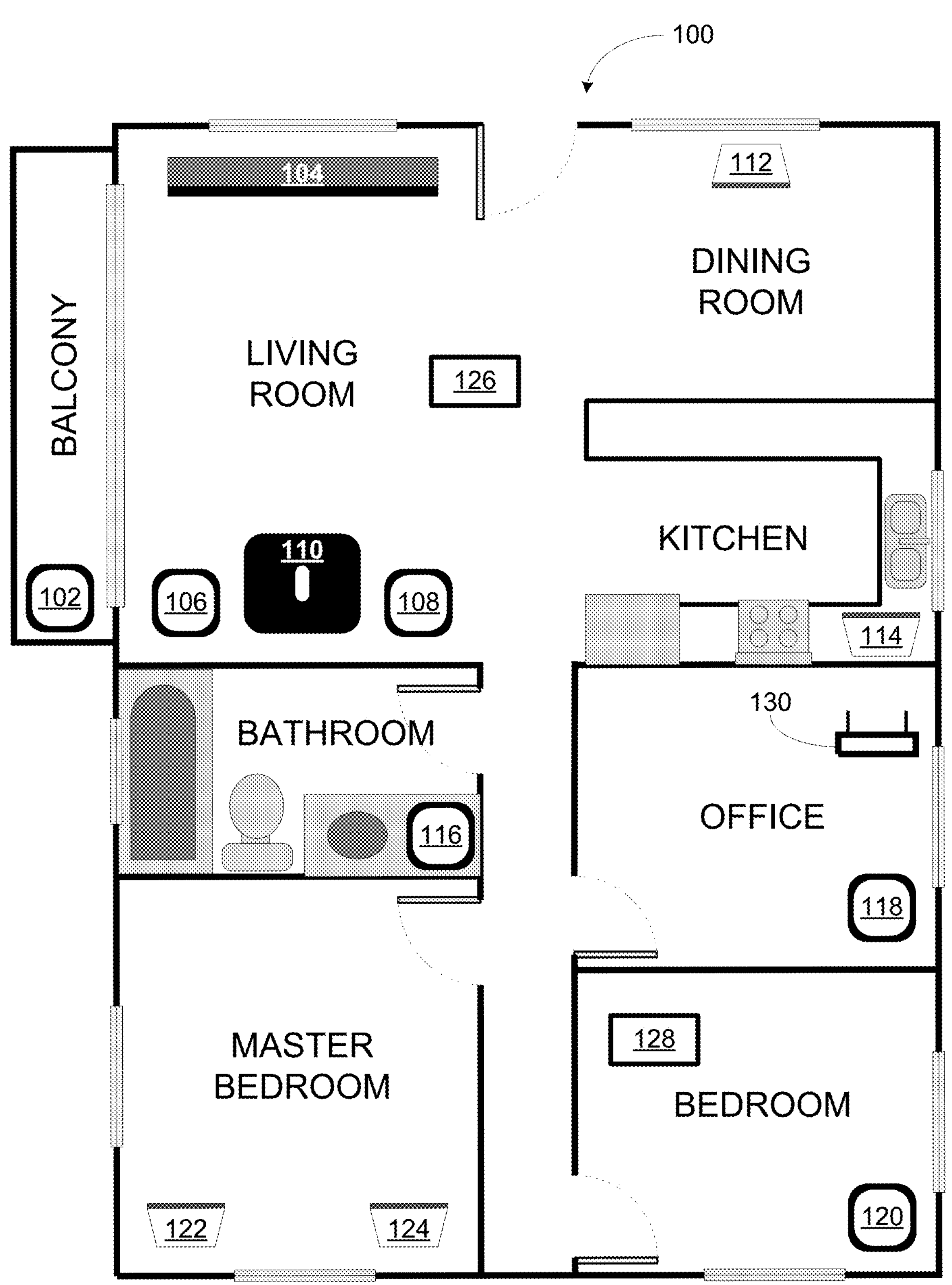
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Listening to media content out loud can be a social activity that involves family, friends, and guests. Media content may include, for instance, talk radio, books, audio from television, music stored on a local drive, music from media sources (e.g., Pandora® Radio, Spotify®, Slacker®, Radio, Google Play™, iTunes Radio), and other audible material. In a household, for example, people may play music out loud at parties and other social gatherings. In such an environment, people may wish to play the music in one listening zone or multiple listening zones simultaneously, such that the music in each listening zone may be synchronized, without audible echoes or glitches.

Such an experience may be enriched when voice commands are used to control an audio playback device or system, among other devices in a household (e.g., lights). For example, a user may wish to change the audio content, playlist, or listening zone, add a music track to a playlist or playback queue, or change a playback setting (e.g., play, pause, next track, previous track, playback volume, and EQ settings, among others) using various voice commands. Some example audio playback devices or systems may include a microphone to detect such voice commands.

In some cases, listening to media content out loud is an individual experience. For example, an individual may play music out loud for themselves in the morning before work, during a workout, in the evening during dinner, or at other times throughout the day at home or at work. For these individual experiences, the individual may choose to limit the playback of audio content to a single listening zone or area. Such an experience may be enriched when an individual can use a voice command to choose a listening zone, audio content, and playback settings, among other settings.

In some instances, networked microphone devices (NMDs) may be used to control a household. An NMD may be, for example, a SONOS® playback device, server, or system capable of receiving voice input via a microphone. Additionally, an NMD may be a device other than a SONOS® playback device, server, or system (e.g., AMAZON® ECHO®, APPLE® IPHONE®) capable of receiving voice inputs via a microphone. U.S. application Ser. No. 15/098,867 entitled, "Default Playback Device Designation," which is hereby incorporated by reference, provides examples of voice-enabled household architectures.

In some conventional approaches, a single NMD may independently receive or process voice inputs or commands. Indeed, some commercially-available devices contemplate the presence of a single NMD. Accordingly, in a situation where multiple such conventional NMDs are present in a single location, the conventional NMDs might react independently to a single voice input. In such a household in which multiple NMDs are present, coordinating and identifying a set of NMDs from which to determine a voice command from the voice recordings of respective NMDs may provide an improved voice recognition technique that enhances user experience.

In some examples, NMDs in a given household may each have one or more microphones to record voice inputs or commands from a user. A computing device may receive a set of respective voice recordings from one or more NMDs and process the voice recordings locally at the computing device or remotely on another device that is connected to the computing device by way of one or more networks. For example, the computing device may communicate with a networked microphone system server, one or more NMDs, playback devices, and/or another computing device to receive or process voice recordings. In some embodiments, the computing device, media playback system server and/or networked microphone system server may be cloud-based server systems. In other embodiments, the computing device itself may be an NMD, playback device, or any other device or server described herein.

The computing device may identify, among the set of voice recordings received from multiple NMDs, which voice recordings to process to determine a given voice command. For instance, in some embodiments, the voice input from any NMD that registers the voice input is processed. Alternatively, the computing device may identify a subset of the recordings. This subset might include any NMD that registered a given voice command at or above a given threshold (e.g., a threshold sound pressure level). As another example, this subset might include voice inputs from a pre-defined number of NMDs (e.g., the three NMDs registering the voice command at or above a given threshold). Other examples are possible as well.

For example, the computing devices may select from among multiple recorded voice inputs based on pre-determined rules. To illustrate, where the NMDs are playback devices, a subset of voice inputs may be selected for processing based on zone configurations of the playback devices. For instance, recordings of a given command from multiple playback devices joined together as a bonded pair (e.g., a stereo pair or surround sound configuration) may be processed together. In some cases, recordings from devices outside the bonded zone may be ignored. As another example, recordings of a given command from multiple zones that are grouped together (as a zone group) may be processed together. Further examples are contemplated as well.

The computing device may cause the identified subset of voice recordings to be analyzed to determine the given voice command. In other words, voice recordings of multiple NMDs may be processed to determine a single voice command. Processing a particular subset of voice recordings may improve accuracy in refining and processing the voice recordings, which in turn may enable a higher-quality speech-to-text conversion of voice commands. More particularly, refining the identified recordings may prevent duplicate, redundant, or separate processing of the same voice recordings (or same portions of a voice recording). In further instances, identifying a subset of voice recordings may reduce processing time in determining a given voice command, perhaps by avoiding duplicate, redundant, or separate processing of the same voice recordings. Examples are described further herein.

NMDs may continuously record or start recording in response to a trigger, among other examples. For instance, a given NMD might continuously record ambient noise but might only provide its recording to the computing device (to possibly be included in processing) if the given NMD (1) itself is woken up by a wake-up word or voice input, or (2) receives an instruction from another device to provide the recording to the computing device. In such implementations, processing of recordings of the given NMD may be triggered, despite the given NMD not necessarily registering a far-field voice input itself (e.g., by registering a wake-up word or voice input).

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments. Moreover, the examples described herein may extend to a multitude of embodiments formed by combining the example features in any suitable manner.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
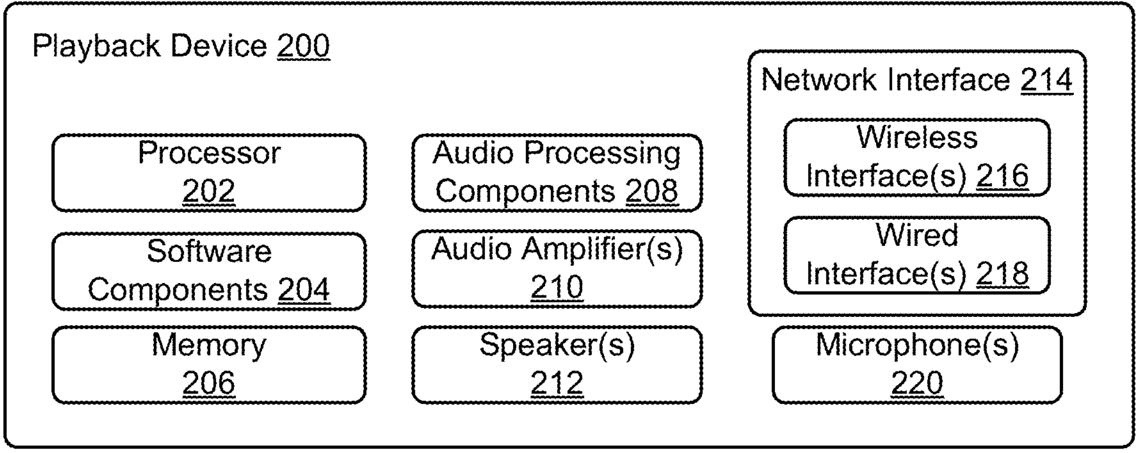
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, a network interface 214 including wireless interface(s) 216 and wired interface(s) 218, and microphone (s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface (s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not include the microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
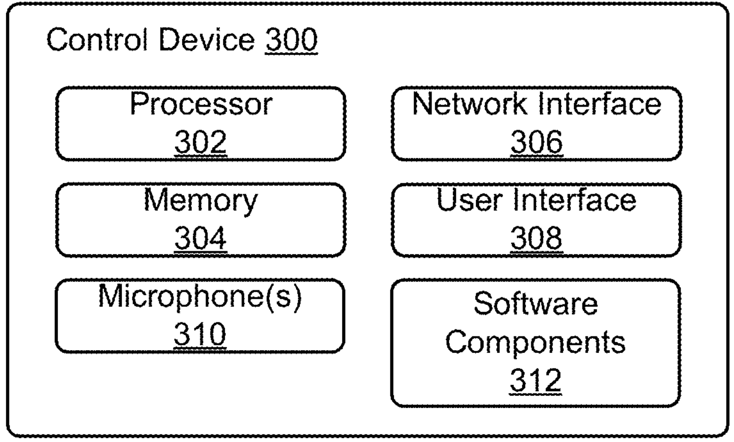
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be data storage that can be loaded with one or more of the software components executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
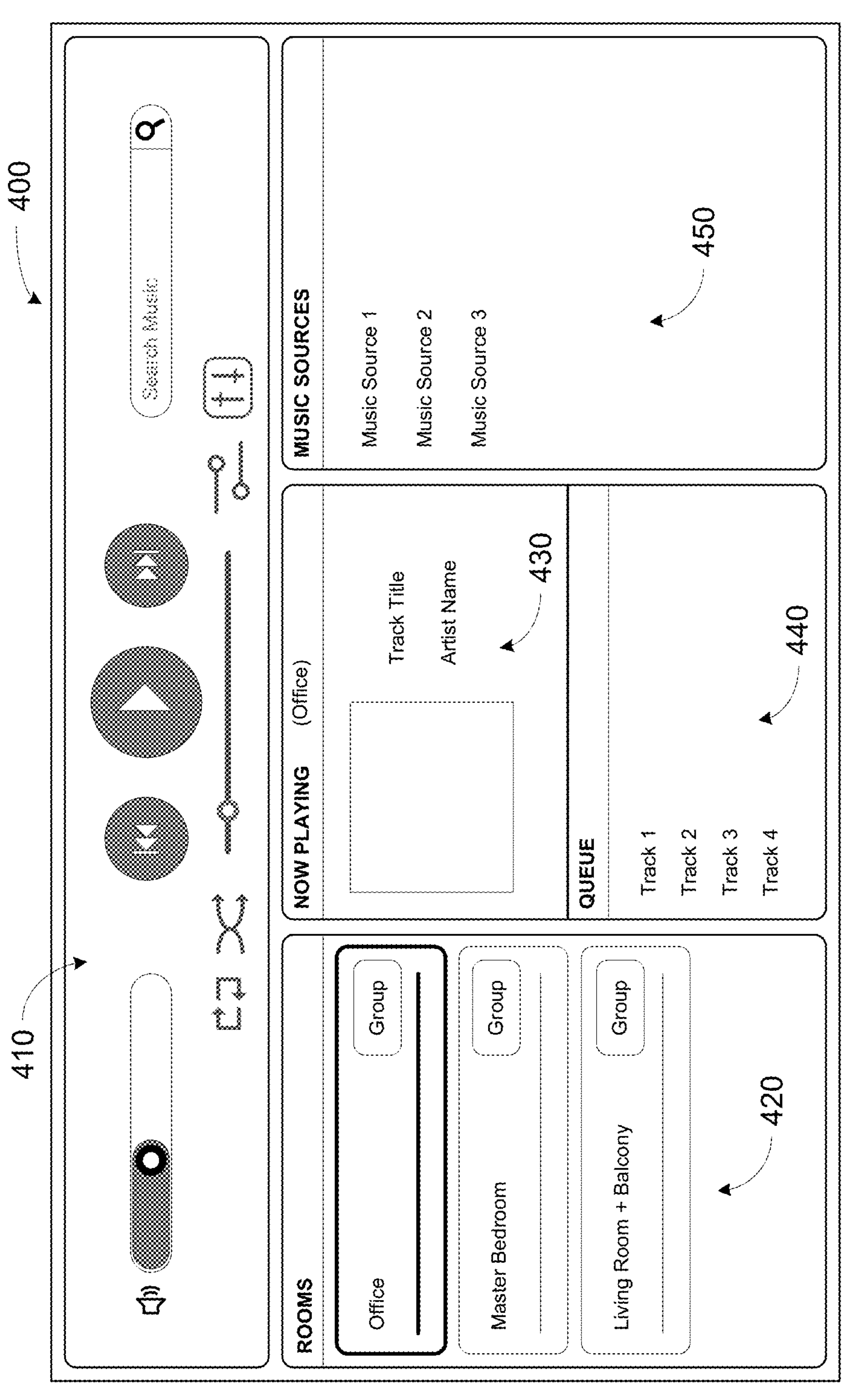
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Networked Devices

Figure 5:
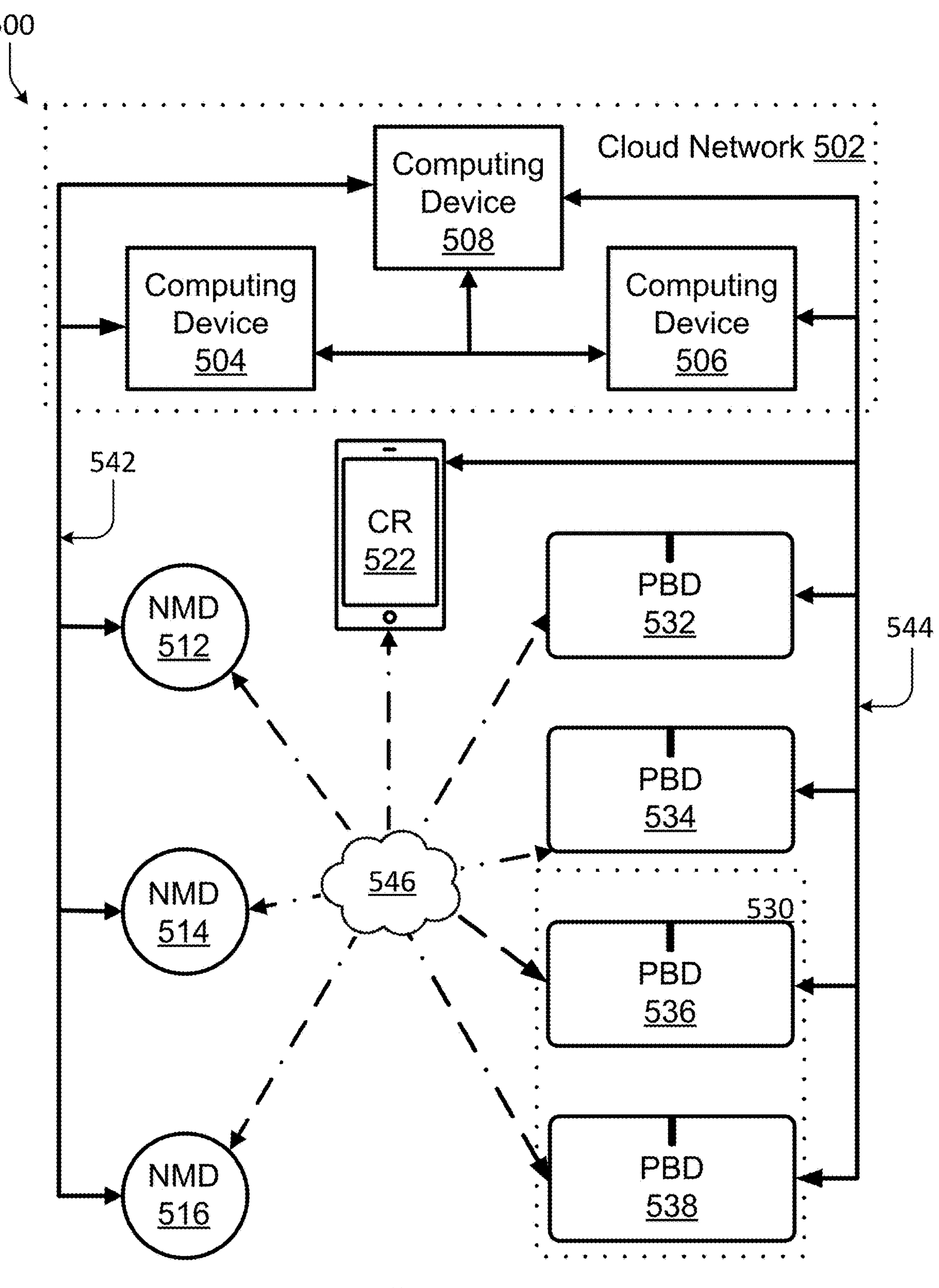
FIG. 5 shows an example plurality of network devices.

FIG. 5 shows an example plurality of devices 500 that may be configured to provide an audio playback experience based on voice control. One having ordinary skill in the art will appreciate that the devices shown in FIG. 5 are for illustrative purposes only, and variations including different and/or additional devices may be possible. As shown, the plurality of devices 500 includes computing devices 504, 506, and 508; network microphone devices (NMDs) 512, 514, and 516; playback devices (PBDs) 532, 534, 536, and 538; and a controller device (CR) 522.

Each of the plurality of devices 500 may be network-capable devices that can establish communication with one or more other devices in the plurality of devices according to one or more network protocols, such as NFC, Bluetooth, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 may be part of a cloud network 502. The cloud network 502 may include additional computing devices. In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 may be devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be the microphone(s) 220 of playback device 200 or the microphone(s) 310 of network device 300. Further, in some cases, one or more of NMDs 512, 514, and 516 may be the playback device 200 or network device 300. In an example, one or more of NMDs 512, 514, and/or 516 may include multiple microphones arranged in a microphone array.

As shown, the computing device 506 may be configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 may be part of a bonded zone 530, while PBDs 532 and 534 may be part of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516.

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, a single access point may include communication paths 542 and 544. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may change depending on types of communication between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506. In another example, the computing device 504 may convert the voice input to an equivalent text command, and then subsequently transmit the text command to the computing device 506. The computing device 506 may then parse the text command to identify one or more playback commands.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of devices 500, as described above, may be performed by one or more other devices in the plurality of device 500. For instance, the conversion from voice input to the text command may be alternatively, partially, or wholly performed by another device or devices, such as NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
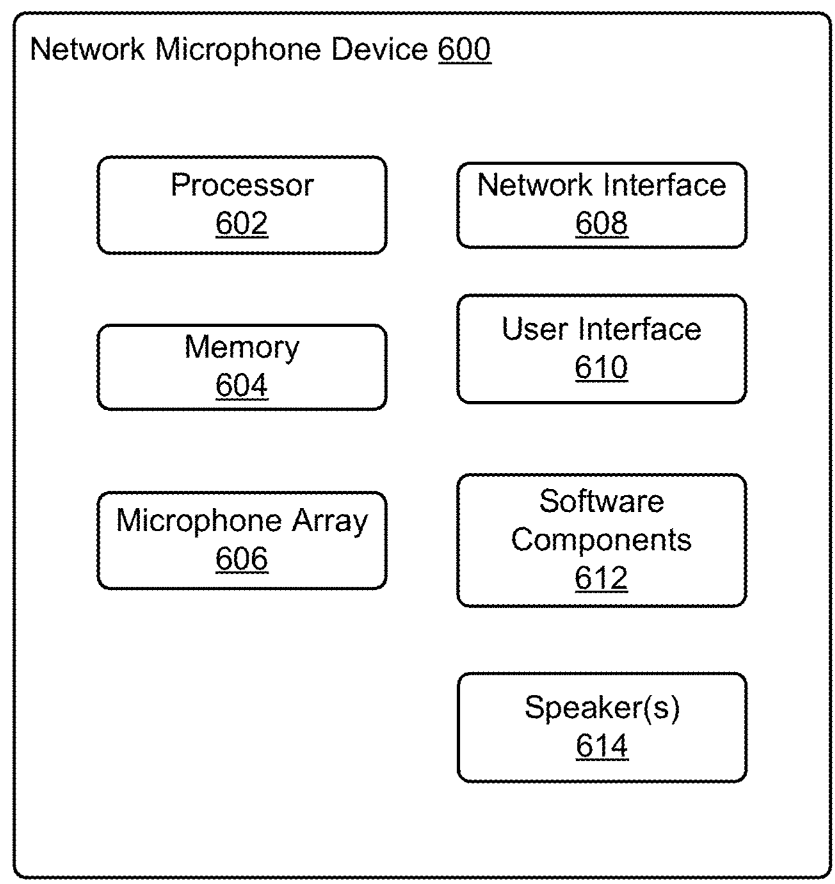
FIG. 6 shows a functional block diagram of an example network microphone device.

FIG. 6 shows a function block diagram of an example network microphone device 600 that may be configured to be one or more of NMDs 512, 514, and 516 of FIG. 5. As shown, the network microphone device 600 includes a processor 602, memory 604, a microphone array 606, a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The processor 602 may include one or more processors and/or controllers, which may take the form of a general or special-purpose processor or controller. For instance, the processing unit 602 may include microprocessors, microcontrollers, application-specific integrated circuits, digital signal processors, and the like. The memory 604 may be data storage that can be loaded with one or more of the software components executable by the processor 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possiblities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing device 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 608 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems and Methods for Voice Detection by Multiple NMDs

As discussed above, in some examples, a computing device may facilitate and coordinate voice recordings of multiple NMDs to determine a voice command. Example voice commands may include commands to modify any of the media playback system controls or playback settings. Playback settings may include, for example, playback volume, playback transport controls, music source selection, and grouping, among other possibilities. Other voice commands may include operations to adjust television control or play settings, mobile phone device settings, or illumination devices, among other device operations. As more household devices become "smart" (e.g., by incorporating a network interface), voice commands may be used to control these household devices.

Generally, it should be understood that one or more functions described herein may be performed by the computing device individually or in combination with the media playback system server, networked microphone system server, PBDs 532-538, NMDs 512-516, CR 522, or any other devices described herein. Alternatively, the computing device itself may be the media playback system server, networked microphone system server, one of the PBDs 532-538, one of the NMDs 512-516, CR 522, or any other device described herein.

Figure 7:
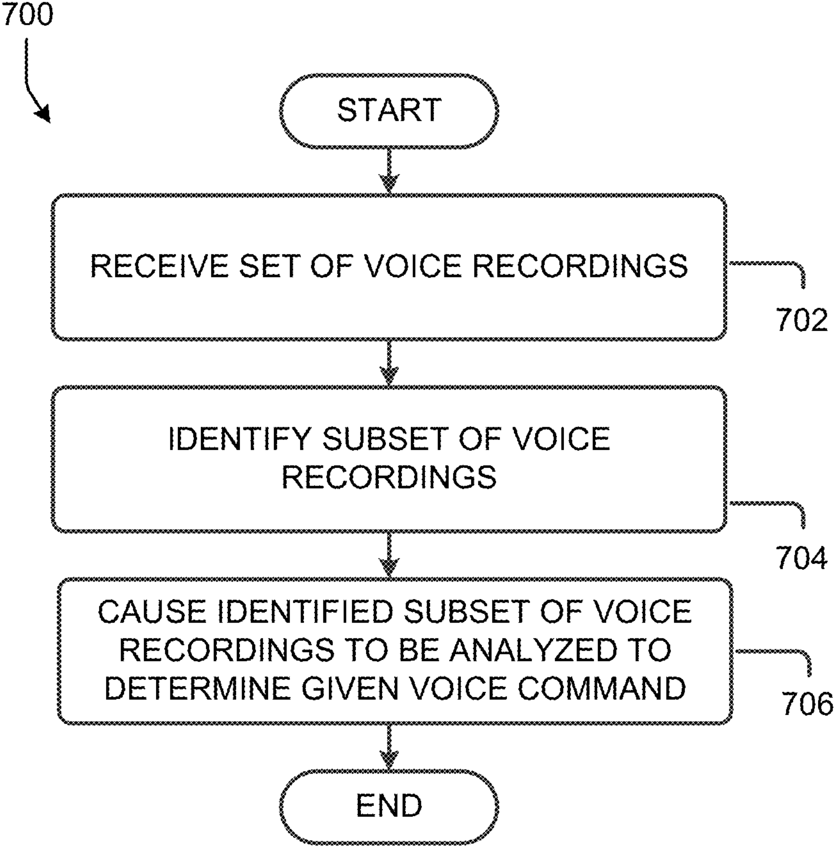
FIG. 7 shows a technique according to example embodiments.

Implementation 700 shown in FIG. 7 presents an embodiment of example techniques described herein. Implementation 700 can be implemented within an operating environment including or involving, for example, the media playback system 100 of FIG. 1, one or more playback devices 200 of FIG. 2, one or more control devices 300 of FIG. 3, the user interface of FIG. 4, and/or the configuration shown in FIG. 5. Implementation 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementation 700 and other processes and methods disclosed herein, the flowchart shows functionality and operation of one possible implementation of some embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 700 and other processes and methods disclosed herein, each block in FIG. 7 may represent circuitry that is wired to perform the specific logical functions in the process.

a. Receive Set of Voice Recordings

At block 702, implementation 700 involves receiving a set of voice recordings. For instance, a computing device, such as computing device 506, may receive a set of voice recordings from one or more NMDs. In some embodiments, a given NMD may have one or more microphones to record voice inputs or commands from a user. For example, one or more NMDs located in or near the living room of a household may record a voice input from a user located in the living room. Additionally, the computing device itself may operate as an NMD and include one or more microphones to record voice input inputs or commands.

In some instances, the computing device may receive voice recordings via a network interface of the computing device, perhaps in addition to receiving voice recordings via a microphone of the computing device. For example, the computing device may communicate and receive voice recordings from the media playback system server, networked microphone system server, PBDs 532-538, NMDs 512-516, CR 522, or any other devices described herein. In some embodiments, the media playback system server and/or networked microphone system server may be cloud-based server systems. The processing NMD may receive voice recordings from any one or a combination of these devices and/or servers.

An NMD may be continuously recording ambient noise (e.g., listening for voice inputs) via one or more microphones. The continuous recording may be stored in a ring or circular buffer, wherein the recording may be discarded unless the recording is needed for processing and determining a given voice command. The buffer may be stored locally and/or remotely via any of the devices or servers described herein.

In other embodiments, some NMDs might not continuously record ambient noise. Rather, in some instances, one or more NMDs may receive a voice input or indication that instructs the one or more NMDs to "wake up" and start recording voice inputs or commands. For example, the computing device 506 may receive a voice input and, in certain situations described herein, send an indication to one or more NMDs to start recording. In other examples, one or more NMDs may receive a specific "wake-up word" (e.g., "hey Sonos", "Siri", "Alexa") that triggers the one or more NMDs to start recording or listen for a voice command.

An NMD may send its voice recording to the computing device upon detecting a voice command or upon being instructed to send its recordings, among other options. For instance, an NMD may transmit a voice recording of a given voice command after registering that voice command (e.g., by registering a voice command preceded by a wake-up word). Alternatively, another NMD or other device may register a voice command and instruct the NMD to transmit recent recordings to the computing device.

In further examples, the computing device may receive only some of the voice recordings from multiple NMDs. The selected voice recording may be provided to the computing device based on various criteria described further herein. For instance, a given NMD might provide its recording to the computing device if the recording meets certain criteria (e.g., that the voice recording was registered at or above a threshold sound pressure level). As another example, another device may register a voice command and, if the registered voice command satisfies certain criteria, may instruct the NMD to transmit recent recordings corresponding to the voice command to the computing device.

Within examples, the voice recordings from multiple NMDs may be refined, processed, and/or combined into a single voice input before the computing device receives the voice recordings. By way of example, the media playback system server may receive voice recordings from one or more NMDs, such as 512-516. In some embodiments, PBDs 532-538 may be configured as NMDs, and the media playback system server may receive voice recordings from PBDs 532-538. The media playback system may refine, process, and/or combine the voice recordings into a single voice input and send the single voice input to the computing device for further processing. Other examples involving the combination of devices and/or servers described herein are possible.

In some examples, the computing device may receive voice recordings from multiple NMDs at different sound pressure levels. For example, a first NMD that is proximate to a user may recorded the user's voice command at a higher sound pressure level voice recording of the user's voice command relative to a second NMD that is further away from the user. As another example, a user might not be stationary when providing the voice command (e.g., a user might moving from the living room to the bedroom). In such instances, a first NMD may have recorded a higher sound-pressure-level voice recording of a first portion of a user's voice command and a second NMD may have recorded a higher sound-pressure-level recording of a second portion of a user's voice command, as caused by the movement of the user while speaking the voice command.

In some cases, multiple NMDs may have recorded identical portions of a user's voice input. For example, a first and second NMD may be proximate to each other and may have each been listening for a voice input. In other cases, multiple NMDs may have recorded different portions of a user's voice input (e.g., the content of the recordings might not overlap at all or might overlap to some degree). By way of example, the second NMD might not have been initially listening for a voice input or a user might not have been nearby (or may have moved to another location while providing a voice input). After the first NMD detects a first portion of a voice command, the first NMD may instruct the second NMD to start recording, which may cause the second NMD to detect a second portion of the voice command. Alternatively, as noted above, the second NMD may be continuously recording, and the computing device may instruct the second NMD to send the portion of its recordings corresponding to the voice command to the computing device.

As noted above, the computing device may itself operate as an NMD. In some cases, the computing device may register a voice command and perhaps instruct other NMDs to record the voice command. For instance, the computing device may record at least a first portion of a given voice command via one or more microphones of the computing device, and cause one or more NMDs to record at least a second portion of the given voice command.

In some implementations, a given NMD may continuously record ambient noise but might only provide its recording to the computing device if the given NMD (1) itself is woken up by a wake-up word or voice input, or (2) receives an instruction from another NMD, device, or system to provide the recording to the computing device. For example, a first NMD may be continuously recording and may, in some instances, record at least a portion of a given voice command received from a user. A second NMD may cause the first NMD to send the voice recording to the computing device via the network interface. In such examples, processing of a particular portion of continuous recordings by a given NMD may be triggered, despite the given NMD not necessarily registering a far-field voice input itself.

To illustrate, referring back to FIG. 1, a user may speak a particular voice command while walking from the Master Bedroom zone to the Bathroom zone. Playback device 122 (and/or playback device 124), operating as NMDs, may register the user's voice as a voice command by way of a wake-up word spoken while the user was in the Master Bedroom. Playback device 122 may record a first portion of the particular voice command. Playback devices 116, 118, and 120 may be instructed to send a portion of their recordings corresponding to the time period when playback device 122 detected the voice command. Given that the user moved to the Bathroom zone in this example, playback device 116 may detect a second portion of the particular voice command and send this second portion to a computing device for processing with the recording of the first portion of the particular voice command made by playback device 122. In this example, a recording made by playback device 116 is processed, despite playback device 116 not registering the voice command itself.

Additionally or alternatively, a given NMD that may be recording ambient noise and/or at least a portion of a given voice command may receive an instruction from another NMD, device, or system to stop recording. Such embodiments may prevent duplicate or separate processing of the same voice input and may provide faster processing of voice recordings to determine the given voice command.

In some implementations, various NMDs may be configured to operate jointly, which may influence which recordings are transmitted to the computing device. For instance, some NMDs may include playback device functionality (or vice versa). As noted above, playback devices may form various groupings (e.g., bonded zones or zone groups, among other examples). When an NMD that is in a group detects a voice command, that NMD may instruct other NMDs in the group to transmit their recordings corresponding to the voice command to the computing device.

For instance, a computing device may receive a first voice recording corresponding to at least a first portion of the given voice command from a first NMD (e.g., a PBD configured as an NMD). While (or after) the computing device receives the first voice recording, the computing device may determine that the first NMD and a second NMD are paired devices (or bonded playback devices) that typically play media content in synchrony with other playback devices. Based on determining that the first and second NMDs are paired devices, the computing device may cause the second NMD to record and provide a second voice recording corresponding to at least a second portion of the given voice command. In some instances in which the second NMD was continuously recording, the computing device may cause the second NMD to provide the voice recording to the computing device. Alternatively, the computing device may cause the second NMD to stop recording to prevent duplicate processing of the same voice input.

In further examples, the computing device may receive a first voice recording corresponding to at least a first portion of the given voice command from a first NMD (e.g., a PBD configured as an NMD). While (or after) the computing device receives the first voice recording, the computing device may determine that the first NMD and one or more other NMDs are part of a zone group that typically play media content in synchrony within the playback zone. In some instances, the computing device may determine that the first NMD and one or more other NMDs are part of a zone scene (e.g., playback devices that are located on a first floor of a household, or playback devices that are grouped at 5 pm on weekdays). Based on such determination, the computing device may cause the one or more other NMDs to record and provide a second voice recording corresponding to at least a second portion of the given voice command. In some instances in which the one or more other NMDs were continuously recording, the computing device may cause the one or more other NMDs to provide the voice recording to the computing device. Alternatively, the computing device may cause the one or more other NMDs to stop recording to prevent duplicate processing of the same voice input.

In some embodiments, a user may define a voice input or command identifying a set of NMDs (e.g., PBDs configured as NMDs) that may be used together as bonded devices, playback zones, and/or zone scenes to record a portion of a given voice command. In such embodiments, the computing device may receive a user-defined command identifying a set of NMDs that are grouped together as a bonded pair, playback zone, or zone scene. Accordingly, the computing device may cause one or more NMDs that are grouped together to record and/or provide a portion of the given voice command. For example, a user may define "downstairs" as part of a given voice command that identifies a set of NMDs in the basement of a household as a zone scene. The computing device may cause one or more of the identified NMDs that are part of the basement zone scene to record the user's voice input corresponding to the given voice command.

In other embodiments, the computing device may cause a set of NMDs that are grouped together as a bonded pair, playback zone, or zone scene to record and/or provide a given voice command when a pre-defined condition is triggered. For example, the computing device may cause a set of NMDs that are part of a zone group to record and/or provide at least a portion of a given voice command only when the user's command is for playback purposes to for instance, watch a movie, or control one or more playback settings (e.g., play or pause a song, play the next or previous song, adjust volume, etc).

In further embodiments, the computing device may learn that a set of NMDs are commonly grouped together as a zone scene to operate jointly (e.g., to play media content in synchrony). Such learning may be based on the configuration history of the NMDs. For instance, an example configuration history may indicate that the set of NMDs have been grouped together on more than a threshold number of instances. As noted above, to illustrate, such a zone scene might include NMDs that are located on a given floor of a house, NMDs that are in listening proximity of one another, NMDs that are commonly grouped together at a particular time (e.g., party mode on weekends) or other scenes. Accordingly, in response to receiving a portion of a given voice command from a first NMD in a particular zone scene, the computing device may cause one or more other NMDs that have been commonly grouped together with the first NMD to record and/or provide at least a portion of the given voice command to the computing device.

In still further embodiments, the computing device may receive a first voice recording of at least a portion of a given voice command from a first NMD, and determine the orientation or direction of the given voice command relative to the first NMD (e.g., relative direction in which a user faces while recording the voice command). Based on the direction of the given voice command relative to the first NMD, the computing device (or any other device/server) may cause a second NMD to listen and record a second voice recording that represents at least a portion of the given voice command.

To illustrate, referring back to FIG. 1, playback device 104 may detect a voice command coming from the direction of the hallway between the bathroom and office zones. Given the direction of the voice command, playback device 116 and/or playback device 118 may be instructed to record and/or transmit recordings corresponding to the voice command to the computing device.

As a further example, referring still to FIG. 1, a user may move from the living room towards the master bedroom. As the user moves, a playback device in the living room (e.g., playback device 104) may send an indication to a second NMD in the bedroom that the second NMD may start recording and/or preprocessing in anticipation of the user's voice command or input. For example, the first NMD may send an indication to the second NMD to start filtering noise outside the fundamental frequency band for human voice (e.g., 85-255 Hz). In other instances, one or more microphones of the second NMD may be steered toward the direction in which the user faces (e.g., entry of the bedroom). Such example embodiments may be accomplished based on determining the orientation or direction of the given voice command relative to the NMDs as described further herein.

Within examples, the media playback system, computing device, and/or NMD receiving a voice command may acknowledge the identity of the particular user providing the voice command to disambiguate from other voice inputs (e.g., other speakers, television, etc). In some instances, the media playback system, computing device, and/or NMD may identify the particular user based on user profiles or voice configuration settings stored in the media playback system and/or one or more combinations of devices described herein. User profiles information may be shared between any of the devices via a network interface. Example user profiles may include voice characteristics that include the tone or frequency of the particular user's voice, age, gender, and user history, among other information identifying the particular user.

In example operations, referring back to FIG. 1, a user may move from the living room towards the master bedroom while providing a voice command. As the user moves, a playback device in the living room (e.g., playback device 104) may identify the user based on the user's profile and send an indication to a second NMD in the bedroom that the second NMD may start recording and/or preprocessing in anticipation of the user's voice command or input. Knowing the identity of the user, the playback device 104 in the living room and the second NMD in the bedroom may disambiguate voice inputs from a television nearby that may interfere with recordings of the user's voice command.

In other instances, the media playback system, computing device, and/or NMD may identify the particular user in response to determining the voice characteristic of the user while receiving a portion of a user's voice input at a particular location. By way of example, referring back to FIG. 1, a male user may be in the master bedroom that may have one or more NMDs (e.g., playback device 122, 124). While the male user provides a voice command or input near or within the master bedroom, the one or more NMDs may acknowledge the identity of the user and determine the voice characteristic (e.g., frequency or tone of male user's voice) of the user. As the user moves away from the master bedroom, the one or more NMDs in the master bedroom may send the voice characteristic to other NMDs located in other living spaces nearby (e.g., bathroom, living room, etc) and instruct the other NMDs to actively listen for voice inputs matching the voice characteristic of the user to disambiguate voice inputs from other sources (e.g., television, female user, etc).

In further instances, an NMD at a particular location may receive a voice command or input that may trigger a time period or window for the NMD or any one or more other NMDs to actively listen for additional voice inputs or commands. In some examples, a wake-up word or phrase (e.g., Hey Sonos) may trigger a time period or window for one or more NMDs to actively listen for additional voice inputs or commands. In other examples, one or more NMDs receiving at least a portion of a voice input may trigger the time period or window for one or more other NMDs to actively listen for additional voice inputs or commands. Within examples, one or more NMDs receiving at least a portion of a voice input may acknowledge the identity of the particular user and trigger the time period or window for one or more other NMDs to actively listen for additional voice inputs or commands from the particular user.

In some implementations, the time period or window may expire after a certain duration of time (e.g., one minute after one or more NMDs receive an initial voice input). In other implementations, a user may specify the time period or window for one or more NMDs to receive additional voice inputs or commands. In particular, one or more NMDs may receive a voice command (e.g., "let's queue up some songs for a minute") that specifies a time period or window (e.g., one minute) for one or more NMDs to actively listen for additional voice inputs (e.g., voice inputs to add songs to a playback queue). In further implementations, one or more NMDs may close or key off the time period or window for receiving additional voice inputs before such time period or window expires. U.S. application Ser. No. 15/131,776 entitled, "Action based on User ID," which is hereby incorporated by reference describes further examples.

In some embodiments, orientation or direction may be determined based on frequency response of the voice inputs or commands. Generally, an NMD that a user is facing while recording a voice input or command may have a larger high-frequency component than an NMD that the user is not facing. Analysis of such components may indicate to the computing device directionality of a voice command. For instance, given (1) data representing the frequency responses of the respective microphones of multiple NMDs and (2) separate time-aligned recordings of the voice inputs by multiple NMDs, a computing device may normalize the frequency response (e.g., 35 Hz-22.05 kHz) of the respective recordings of the voice inputs with respect to the low frequency band. For instance, the frequency response of the voice inputs recorded from a first NMD may be normalized with a second NMD with respect to the fundamental frequency band for human voice (e.g., 85-255 Hz). The high-frequency components of the normalized responses of the voice inputs may then be compared to determine the direction in which the user is facing while recording the voice command.

In other embodiments, orientation or direction of a voice input may be determined by using the variance in the known polar responses of two or more microphones of an NMD. The variance may help determine the angle of the user (or voice input) relative to an NMD, perpendicular to the plane of the two or more microphones. The angle of the user relative to an NMD may help more precisely locate the direction in which the user is facing while recording the voice input and may add an additional level of confidence that the voice input was received from a certain direction or orientation. Such angles may be identified by measuring the polar responses of the voice inputs at each microphone simultaneously and matching the variance with the known polar responses.

In further embodiments, the angle of the user relative to an NMD may be determined by measuring the delay across two or more microphones with a known distance between them. Further examples may include visual imaging, measuring the relative magnitude across two or more microphones or NMDs, Bluetooth proximity detection between an NMD and another computing device, such as a mobile phone, or monitoring WiFi Received Signal Strength Indication (RSSI) to detect user proximity and/or location.

b. Identify Subset of Voice Recordings

At block 704, implementation 700 involves identifying a subset of voice recordings. For instance, the computing device (e.g., computing device 506) may identify, among the set of voice recordings, a subset of voice recordings from which to determine a given voice command. Alternatively, the computing device may use all of the voice recordings received from respective NMDs to determine a given voice command.

In some instances, identifying the subset of voice recordings may include a device other than the computing device (e.g., the media playback server) locally or remotely (via a network interface) determining the subset of voice recordings and providing the subset to the computing device. Some implementations may involve one or more combinations of devices or servers other than the computing device determining the subset of voice recordings.

In some embodiments, the computing device may identify a subset of voice recordings by comparing the received voice recordings from a set of NMDs with a threshold sound pressure level or threshold volume level. The threshold, for example, may be an absolute threshold such as magnitude or a relative threshold that may be normalized according to the highest-magnitude of the voice recordings. In some embodiments, the computing device may identify the voice recordings (or NMDs) that exceed the threshold level as the subset of voice recordings (or NMDs) to determine the given voice command. In other embodiments, the computing device may identify a predetermined number of NMDs (e.g., three NMDs) that recorded at least a portion of the given voice command at the highest sound pressure levels to determine the given voice command. Identifying the subset of voice recordings in such manner may ensure greater accuracy in refining and processing the voice recordings and enable a higher-quality speech to text conversion to determine a given voice command.

In other embodiments, the computing device may identify the voice recordings of NMDs based on various rules or criteria. For instance, voice recordings from NMDs that are grouped together as bonded pairs, playback zones, and/or zone scenes may be identified as the subset of voice recordings from which to determine the given voice command.

Identifying the subset of voice recordings in such manner may be useful when a voice command is invoked for playback purposes. For example, NMDs in the living room and kitchen of a household may record at least a portion of a user's voice command. The computing device may identify the voice recordings of NMDs in the living room as the subset of voice recordings from which to determine the given voice command. In other examples, a set of NMDs in the living room may record at least a portion of a user's voice command. The computing device may identify the voice recordings of a pair of NMDs in the living room that are bonded together as the subset of voice recordings from which to determine the given voice command.

In further examples, a set of NMDs on the first and second floor of a household may record at least a portion of a user's voice command. The computing device may identify the voice recordings of the NMDs on the first floor as the subset of voice recordings from which to determine the given voice command. In some instances, as described above, the computing device may identify the voice recordings of NMDs that have been commonly grouped together as a zone scene on a threshold number of instances as the subset of voice recordings from which to determine the given voice command.

In other embodiments, the computing device may identify two or more voice recordings of NMDs that are acoustically coupled as the subset of voice recordings from which to determine the given voice command. In some instances, the computing device may cause an NMD to determine whether it is acoustically coupled to one or more other NMDs. For example, the computing device may cause a first NMD to play or output a test tone (or any other audio content) and may cause a second NMD to detect the tone via one or more microphones of the second NMD. The computing device may compare the magnitude of the detected test tone with a threshold sound pressure level to determine whether the first and second NMD are acoustically coupled. In other examples, the first NMD may be playing audio content and the second NMD may register the audio content via one or more microphones. The computing device may compare the magnitude of the registered audio content with a threshold sound pressure level to determine whether the first and second NMD are acoustically coupled. Based on the acoustic coupling of two more NMDs, the computing device may identify such NMDs as the subset from which to determine the given voice command.

c. Cause Identified Subset of Voice Recordings to be Analyzed to Determine Given Voice Command At block 706, implementation 700 involves causing the identified subset of voice recordings to be analyzed to determine the given voice command. For instance, the computing device, such as computing device 506, may cause a subset of voice recordings to be analyzed to determine the given voice command.

In some cases, the computing device may analyze the subset of voice recordings itself. Alternatively, any one or a combination of the devices or servers described herein may cause the identified subset of voice recordings to be analyzed to determine the given voice command, which may be facilitated by one or more networks connecting the devices (e.g., connection means 546).

In some examples, the computing device may cause the identified subset of voice recordings to be analyzed by communicating with an NMD. The computing device may send the identified recordings to the NMD, and the NMD may determine and execute the voice command. Within examples, the computing device may determine the given voice command from the identified subset of voice recordings and send the determined voice command to the NMD to execute the voice command. Other examples involving one or a combination of the devices or servers described herein are possible.

In some embodiments, the computing device may cause the identified subset of voice recordings to be analyzed to determine the given voice command by processing and refining the identified subset of voice recordings. Alternatively, the computing device may process the identified subset of voice recordings without refinement. Refining the identified recordings, however, may enable a higher-quality speech to text conversion. In some implementations, the subset of voice recordings may be refined before identifying the subset of voice recordings. For example, computing device 506 may receive a set of voice recordings and refine the voice recordings locally or remotely before identifying the subset of voice recordings. In other examples, the set of voice recordings may be refined by one or more combination of devices or servers before the computing device (e.g., computing device 506) receives the set of voice recordings. The computing device may identify a subset of voice recordings from the received set of refined voice recordings.

The computing device may time-align the identified subset of voice recordings. Time aligning the voice recordings may prevent processing of redundant or duplicate portions of the given voice command. For instance, a first NMD and a second NMD may have recorded at least a portion of a given voice command at a given time. The first NMD may have recorded some overlapping portion at a given time in which the second NMDs may have been recording. Accordingly, the computing device may time-align the voice recordings from the first and second NMDs and refine or strip out the overlapping portions of the voice recordings according to various criteria described herein.

In some examples, the computing device may take the magnitude-weighted average of the identified subset of voice recordings. A respective portion of a voice recording with a higher magnitude (e.g., higher sound pressure level) may be given a higher weight and may be more likely to be processed to determine the given voice command.

In other examples, the computing device may combine the recordings by determining an average of the identified subset of voice recordings. Such an average may be weighted according to microphone quality and/or quantity of respective NMDs. Some NMDs may have multiple microphones and some NMDs may have better quality microphones than other NMDs. Accordingly, the computing device may determine the magnitude-weighted average of the identified subset of voice recordings based on such factors.

The computing device may "chop" the identified subset of voice recordings and splice them together. For example, at noted above, a user may be moving from the living room to the bedroom of a household while providing a given voice command. Based on determining the relative orientation or direction of the identified subset of voice recordings of respective NMDs, the computing device may use the identified subset of voice recordings from the living room as the first portion from which to determine the given voice command and the identified subset of voice recordings from the bedroom as the second portion from which to determine the given voice command.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A system comprising:

a first microphone array;

a second microphone array;

at least one processor; and at least one non-transitory computer-readable medium comprising program instructions that are executable by the at least one processor such that the system is configured to:

receive first voice data captured via the first microphone array, the first voice data representing a first portion of a voice input;

receive second voice data captured via the second microphone array, the second voice data representing the first portion of the voice input;

based on (i) one or more characteristics of the first voice data and (ii) one or more characteristics of the second voice data, select the first voice data from among (a) the first voice data and (b) the second voice data;

receive third voice data captured via the first microphone array, the third voice data representing a second portion of the voice input;

receive fourth voice data captured via the second microphone array, the fourth voice data representing the second portion of the voice input;

based on (i) one or more characteristics of the third voice data and (ii) one or more characteristics of the fourth voice data, select the fourth voice data from among (a) the third voice data and (b) the fourth voice data; and send the selected first voice data and the selected fourth voice data to a voice assistant for processing of the voice input.

2. The system of claim 1, further comprising a processing network microphone device (NMD), and wherein the processing NMD comprises the at least one processor and the at least one non-transitory computer-readable medium.

3. The system of claim 2, wherein the at least one non-transitory computer-readable medium further comprises program instructions that are executable by the at least one processor such that the system is configured to:

determine, via the voice assistant, one or more commands represented in the voice input; and cause one or more devices to carry out the determined one or more commands.

4. The system of claim 1, wherein the program instructions that are executable by the at least one processor such that the system is configured to send the selected first voice data and the selected fourth voice data to the voice assistant for processing of the voice input comprise program instructions that are executable by the at least one processor such that the system is configured to:

send, via a network interface to at least one server comprising the voice assistant, data representing the selected first voice data and the selected fourth voice data.

5. The system of claim 1, wherein the program instructions that are executable by the at least one processor such that the system is configured to receive the second voice data captured via the second microphone array comprise program instructions that are executable by the at least one processor such that the system is configured to:

receive, via an 802.15-compatible wireless network interface, the second voice data.

6. The system of claim 1, wherein the one or more characteristics of the first voice data comprise first sound pressure levels of the first portion of the voice input as detected by the first microphone array, wherein the one or more characteristics of the second voice data comprise second sound pressure levels of the first portion of the voice input as detected by the second microphone array, and wherein the program instructions that are executable by the at least one processor such that the system is configured to select the first voice data comprise program instructions that are executable by the at least one processor such that the system is configured to:

determine that the first sound pressure levels of the first portion of the voice input as detected by the first microphone array are greater than then the second sound pressure levels of the first portion of the voice input as detected by the second microphone array.

7. The system of claim 1, wherein the first portion of the voice input and the second portion of the voice input at least partially overlap.

8. The system of claim 1, wherein a wearable playback device comprises the first microphone array and the second microphone array.

9. The system of claim 1, wherein a first wearable playback device comprises the first microphone array and a second wearable playback device comprises the second microphone array.

10. At least one non-transitory computer-readable medium comprising program instructions that are executable by at least one processor such that a device is configured to:

receive first voice data captured via a first microphone array of a playback device, the first voice data representing a first portion of a voice input;

receive second voice data captured via a second microphone array of the playback device, the second voice data representing the first portion of the voice input;

based on (i) one or more characteristics of the first voice data and (ii) one or more characteristics of the second voice data, select the first voice data from among (a) the first voice data and (b) the second voice data;

receive third voice data captured via the first microphone array, the third voice data representing a second portion of the voice input;

receive fourth voice data captured via the second microphone array, the fourth voice data representing the second portion of the voice input;

based on (i) one or more characteristics of the third voice data and (ii) one or more characteristics of the fourth voice data, select the fourth voice data from among (a) the third voice data and (b) the fourth voice data; and send the selected first voice data and the selected fourth voice data to a voice assistant for processing of the voice input.

11. The at least one non-transitory computer-readable medium of claim 10, wherein the at least one non-transitory computer-readable medium further comprises program instructions that are executable by the at least one processor such that the device is configured to:

determine, via the voice assistant, one or more commands represented in the voice input; and cause one or more devices to carry out the determined one or more commands.

12. The at least one non-transitory computer-readable medium of claim 10, wherein the program instructions that are executable by the at least one processor such that the device is configured to send the selected first voice data and the selected fourth voice data to the voice assistant for processing of the voice input comprise program instructions that are executable by the at least one processor such that the device is configured to:

send, via a network interface to at least one server comprising the voice assistant, data representing the selected first voice data and the selected fourth voice data.

13. The at least one non-transitory computer-readable medium of claim 10, wherein the program instructions that are executable by the at least one processor such that the device is configured to receive the second voice data captured via the second microphone array comprise program instructions that are executable by the at least one processor such that the device is configured to:

receive, via an 802.15-compatible wireless network interface, the second voice data.

14. The at least one non-transitory computer-readable medium of claim 10, wherein the one or more characteristics of the first voice data comprise first sound pressure levels of the first portion of the voice input as detected by the first microphone array, wherein the one or more characteristics of the second voice data comprise second sound pressure levels of the first portion of the voice input as detected by the second microphone array, and wherein the program instructions that are executable by the at least one processor such that the device is configured to select the first voice data comprise program instructions that are executable by the at least one processor such that the device is configured to:

determine that the first sound pressure levels of the first portion of the voice input as detected by the first microphone array are greater than then the second sound pressure levels of the first portion of the voice input as detected by the second microphone array.

15. The at least one non-transitory computer-readable medium of claim 10, wherein the first portion of the voice input and the second portion of the voice input at least partially overlap.

16. The at least one non-transitory computer-readable medium of claim 10, wherein the playback device comprises one or more wearable housings.

17. A device comprising:

at least one processor; and at least one non-transitory computer-readable medium comprising program instructions that are executable by the at least one processor such that the device is configured to:

receive first voice data captured via a first microphone array of a playback device, the first voice data representing a first portion of a voice input;

receive second voice data captured via a second microphone array of the playback device, the second voice data representing the first portion of the voice input;

based on (i) one or more characteristics of the first voice data and (ii) one or more characteristics of the second voice data, select the first voice data from among (a) the first voice data and (b) the second voice data;

receive third voice data captured via the first microphone array, the third voice data representing a second portion of the voice input;

receive fourth voice data captured via the second microphone array, the fourth voice data representing the second portion of the voice input;

based on (i) one or more characteristics of the third voice data and (ii) one or more characteristics of the fourth voice data, select the fourth voice data from among (a) the third voice data and (b) the fourth voice data; and send the selected first voice data and the selected fourth voice data to a voice assistant for processing of the voice input.

18. The device of claim 17, wherein the at least one non-transitory computer-readable medium further comprises program instructions that are executable by the at least one processor such that the device is configured to:

determine, via the voice assistant, one or more commands represented in the voice input; and cause one or more devices to carry out the determined one or more commands.

19. The device of claim 17, wherein the program instructions that are executable by the at least one processor such that the device is configured to send the selected first voice data and the selected fourth voice data to the voice assistant for processing of the voice input comprise program instructions that are executable by the at least one processor such that the device is configured to:

send, via a network interface to at least one server comprising the voice assistant, data representing the selected first voice data and the selected fourth voice data.

20. The device of claim 17, wherein the program instructions that are executable by the at least one processor such that the device is configured to receive the second voice data captured via the second microphone array comprise program instructions that are executable by the at least one processor such that the device is configured to:

receive, via an 802.15-compatible wireless network interface, the second voice data.

* * * * *